United States Patent
Harrison et al.

(10) Patent No.: US 9,886,483 B1
(45) Date of Patent: Feb. 6, 2018

(54) SYSTEM FOR PROVIDING STRUCTURED QUERY LANGUAGE ACCESS TO NON-RELATIONAL DATA STORES

(75) Inventors: Guy Anthony Harrison, Aspendale Gardens (AU); Gregory John Cottman, Wantirna South (AU); Timothy Harold Jarvis, Blackburn North (AU); Kieron Spencer Briggs, Brunswick East (AU); Ben Kersten, Hawthorne (AU); Johny Mattsson, Collingwood (AU)

(73) Assignee: Quest Software Inc., Aliso Viejo, CA (US)

( * ) Notice: Subject to any disclaimer, the term of this patent is extended or adjusted under 35 U.S.C. 154(b) by 97 days.

(21) Appl. No.: 13/098,298

(22) Filed: Apr. 29, 2011

Related U.S. Application Data

(60) Provisional application No. 61/329,354, filed on Apr. 29, 2010.

(51) Int. Cl.
*G06F 17/30* (2006.01)
(52) U.S. Cl.
CPC .. *G06F 17/30466* (2013.01); *G06F 17/30445* (2013.01); *G06F 17/30498* (2013.01)
(58) Field of Classification Search
CPC .................................................. G06F 17/30498
USPC ......................... 707/714, 810, 740
See application file for complete search history.

(56) References Cited

U.S. PATENT DOCUMENTS

| | | | |
|---|---|---|---|
| 5,379,419 A | * | 1/1995 | Heffernan et al. |
| 5,864,842 A | * | 1/1999 | Pederson et al. |
| 6,640,221 B1 | | 10/2003 | Levine et al. |
| 7,162,464 B1 | | 1/2007 | Miller et al. |
| 7,275,024 B2 | | 9/2007 | Yeh et al. |
| 7,421,427 B2 | | 9/2008 | DeForeest et al. |
| 7,647,298 B2 | | 1/2010 | Adya et al. |
| 7,657,516 B2 | | 2/2010 | Zaman et al. |
| 7,747,608 B1 | | 6/2010 | Gheorghe et al. |

(Continued)

OTHER PUBLICATIONS

NoSQL, A Relational Database Management System, http://www.strozzi.it/cgi-bin/CSA/tw7/I/en_US/nosq1/Home%20Page 3 pages.

(Continued)

*Primary Examiner* — Boris Gorney
*Assistant Examiner* — Bao Tran
(74) *Attorney, Agent, or Firm* — Winstead PC

(57) ABSTRACT

Systems and methods for providing structured query language (SQL) access to non-relational data stores are described. SQL access can be provided to a non-relational data store in one embodiment by mapping storage attributes of the data store to one or more virtual relational tables. The virtual tables can include a schema representation of data stored in a non-relational data store without actually including the data in the virtual tables. In some embodiments, these systems and methods therefore advantageously merge certain benefits of relational database architectures with the scalability benefits of certain non-relational data store architectures. Certain features of the systems and methods described herein can also be used with existing relational databases. For example, the systems and methods described herein can perform join or similar operations between a relational table in one data store and a data object in another data store.

21 Claims, 28 Drawing Sheets

(56) References Cited

U.S. PATENT DOCUMENTS

| | | | |
|---|---|---|---|
| 2005/0091238 A1* | 4/2005 | Zane | G06F 17/30421 |
| 2006/0271568 A1 | 11/2006 | Balkir et al. | |
| 2008/0065592 A1* | 3/2008 | Doyle | G06F 17/30445 |
| 2009/0132544 A1* | 5/2009 | Hattori | G06F 17/30445 |
| 2009/0249125 A1 | 10/2009 | Bhatawdekar et al. | |
| 2009/0254916 A1* | 10/2009 | Bose | G06F 17/30477 718/104 |
| 2010/0017395 A1 | 1/2010 | Wayn et al. | |
| 2010/0049649 A1* | 2/2010 | Shepherd | 705/37 |
| 2010/0121868 A1* | 5/2010 | Biannic et al. | 707/759 |
| 2010/0153430 A1 | 6/2010 | Mordvinov et al. | |
| 2010/0161593 A1 | 6/2010 | Paulsen et al. | |
| 2011/0082854 A1* | 4/2011 | Eidson | G06F 17/30463 707/714 |
| 2011/0161371 A1 | 6/2011 | Thomson et al. | |
| 2011/0295833 A1 | 12/2011 | Narasayya et al. | |
| 2013/0159974 A1 | 6/2013 | Norton et al. | |
| 2013/0238658 A1 | 9/2013 | Burris | |

OTHER PUBLICATIONS

Perry, Geva, "How Cloud & Utility Computing Are Different", http://gigaom.com/2008/02/28/how-cloud-utility-computing-are-diferent/ 21 pages.
Understanding MySQL Internals Chapter 7 p. 119.
Browne, Julian, "Brewer's CAP Theorem", http://www.julianbrowne.com/article/viewer/brewers-cap-theorem 8 pages, Jan. 11, 2009.
Bouman, Ronald, My SQL 5.1 Plugins, http://rpbouman.blogspot.com/ pp. 1-15.
Amazon Elastic Compute Cloud Elasticfox, Getting Started Guide, Elasticfox Version 1.7-000108.
Quest Software, Toad for Data Analysts, 2 pages.
Harrison, Guy, Quest Software, "DBMS.next is the next DBMS revolution looming?", 6 pages.
Lai, Eric, "NO to SQL? Anti-database movement gains steam, but can enterprises take open-source alternatives Hadoop, Voldemort seriously?", Jul. 1, 2009, http://www.computerworld.com/s/article/print/9135086/No_to_SQL_Ant . . . 2 pages.
U.S. Appl. No. 14/073,822, Jonsson.
U.S. Appl. No. 14/633,826, Alagappan.
Shiers, Alan; "SQLeo Beginner Users Guide"; sqleo.sourceforge.net/guide/#_Toc327875425; Jun. 20, 2012; 37 pages.
Activedbsoft.; "Customizable SQL Query Building Environment: Simple and Clear Presentation of Database Structure and User Queries"; http://activequerybuilder.com/product_environment.html; Aug. 23, 2014; 3 pages.
Activedbsoft.; "Metadata Handling and Filtration: Various Ways to Load and Represent Metadata in Active Builder"; http://www.activequerybuilder.com/product_metadata.html; Jul. 14, 2014; 3 pages.
Activedbsoft.; "Programming API: Programmatic SQL Query Analysis and Modification"; http://activequerybuilder.com/product_api.html; Aug. 24, 2014; 3 pages.
Activedbsoft.; "Visual User Interface: Building Complex SQL Queries Visually Was Never Been So Easy"; http://activequerybuilder.com/product_ui.html; Aug. 23, 2014; 4 pages.
Activedbsoft.; "Active Query Builder: Visual SQL Query Builder Component"; http://activequerybuilder.com/product.html; Aug. 23, 2014; 4 pages.
Lount, Tina; "Alpine Overview"; https://alpine.atlassian.net/wiki/display/DOC/Alpine+Overview; Oct. 2, 2014; 2 pages.
Williams, Alex; "Alteryx Opens Big Data-Analytics Apps Studio for the Rest of Us"; http://techcrunch.com/2012/10/07/alteryx-opens-big-data-analytics-apps-studio-for-the-rest-of-us/; Oct. 7, 2012; 7 pages.
Devart; "Hands-Free Building of Queries with Query Builder"; http://www.devart.com/dbforge/mysql/studio/demostutorials/querybuilder.html; Aug. 12, 2014; 5 pages.
Activedbsoft.; "FlySpeed SQL Query"; http://www.activedbsoft.com/overview-querytool.html; Aug. 20, 2013; 3 pages.
"Graphical Query Builder"; http://pgadmin.org/docs/dev/gqb.html; May 26, 2013; 2 pages.
"Graphical Query Designer User Interface"; http://msdn.microsoft.com/en-us/library/ms365414.aspx; Jul. 17, 2013; 6 pages.
Grimes, Seth; "Lyzasoft's Non-Analytical Approach to Analytics"; http://www.informationweek.com/software/information-management/lyzasofts-non-analytical-approach-to-analytics/d/d-id/1072214?; Sep. 22, 2008; 6 pages.
Wikimedia Foundation, Inc.; "OpenRefine"; http://en.wikipedia.org/wiki/OpenRefine; last modified Nov. 11, 2014; 5 pages.
Standen, James; "Putting Data Analysis into the Hands of the Business User"; http://datamartist.com/data-analysis-for-the-business-user; Jul. 24, 2014; 3 pages.
"Query Tool"; http://pgadmin.org/docs/dev/query.html; Jul. 8, 2014; 5 pages.
Embarcadero Technologies, Inc.; "Embarcadero Rapid SQL User Guide" version 8.7.2/XE6; Dec. 2014; 1085 pages.
Kaldirimoglu, Devrim; "Springbok: Self-Service Data for Business Users"; Jun. 15, 2014; 2 pages.
Kandel, Sean; "Value of Data Transformation"; 2014; 5 pages.
Oracle; "Using Query Builder in Oracle SQL Develper 3.0" http://www.oracle.com/webfolder/technetwork/tutorials/obe/db/sqldev/r30/SQLdev3.0_Q . . . ; Dec. 15, 2013; 19 pages.
Datameer, Inc.; "What is Big Data Analytics?"; http://www.datameer.com/product/data-analytics.html; Jul. 4, 2014; 3 pages.
Harris, Derrick; "Why Trifacta is Teaching Humans and Data to Work Together"; Oct. 4, 2012; 9 pages.
Wikimedia Foundation, Inc.; "WYSIWYG"; http://en.wikipedia.org/wiki/WYSIWYG; last modified on Dec. 1, 2014; 6 pages.
U.S. Appl. No. 14/869,072, Jonsson et al.

* cited by examiner

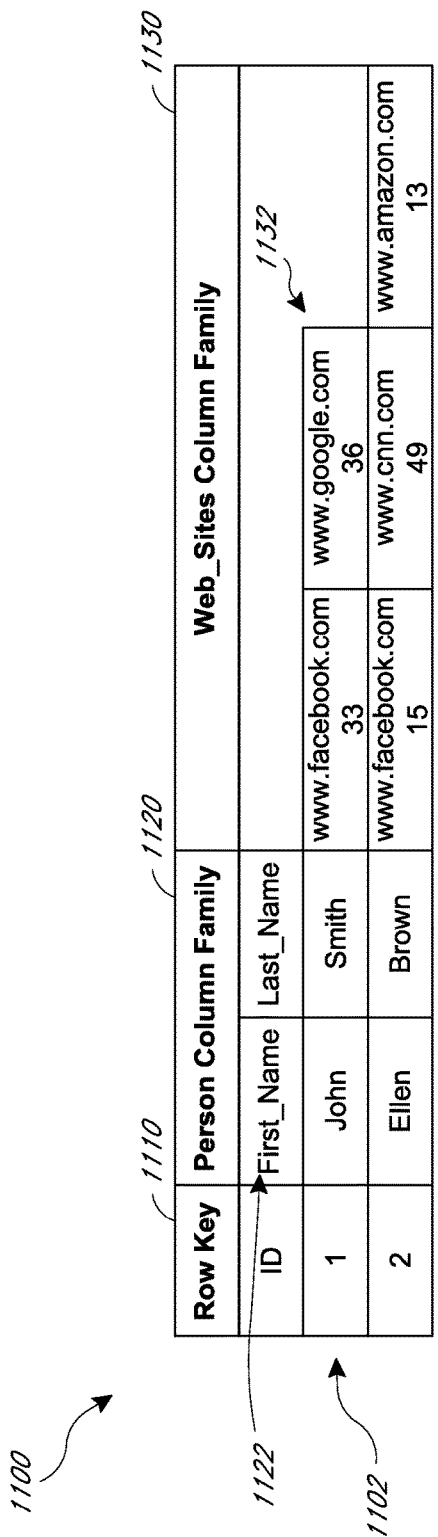
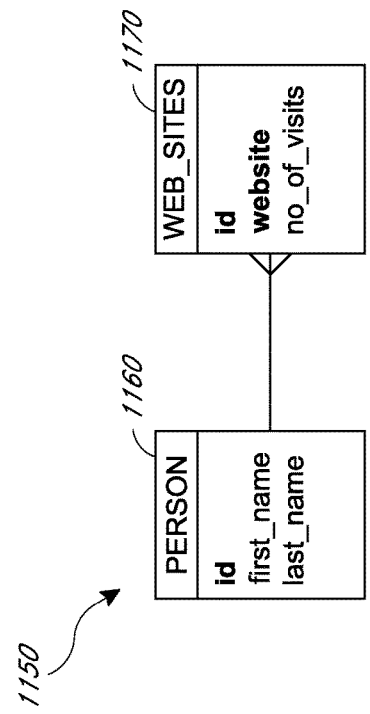
FIG. 11A
FIG. 11B

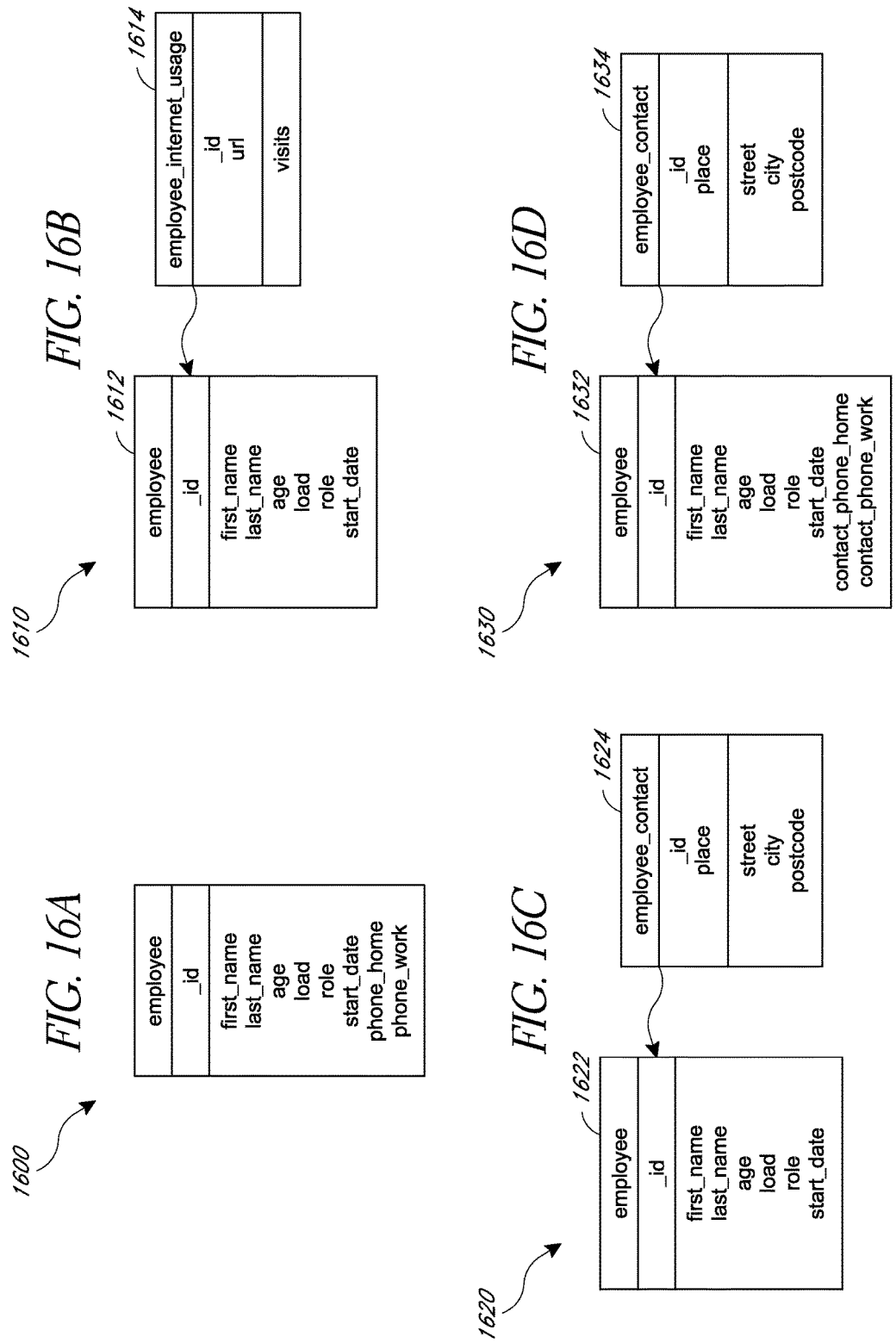

SYSTEM FOR PROVIDING STRUCTURED QUERY LANGUAGE ACCESS TO NON-RELATIONAL DATA STORES

RELATED APPLICATION

This application claims the benefit of priority under 35 U.S.C. §119(e) of U.S. Provisional Patent Application No. 61/329,354, filed on Apr. 29, 2010, entitled "System for Providing Structured Query Language Access to Non-relational data stores," the disclosure of which is hereby incorporated by reference in its entirety.

BACKGROUND

Relational database management systems (RDBMS) have been the dominant form of database systems over the past two decades. A major advantage of RDBMS is the ability to extract data from a database using intuitive Structured Query Language (SQL) statements. Business professionals and data analysts can therefore access a relational database without having specialized programming skills.

Today, however, RDBMS are increasingly seen as an obstacle to achieving scalability in certain applications. For instance, RDBMS implementation is meeting resistance in virtualized environments, large-scale network applications (such as social networking applications), and in on-demand distributed network environments (often referred to as "cloud computing" environments). A source of this difficulty is that it is difficult to cluster relational databases. In a database cluster, data is either replicated across machines in the cluster or is partitioned among them. In either case, adding a machine to the cluster generally requires data to be copied or moved to the new machine. Since this data shipping can be a time-consuming and expensive process, relational databases are difficult to dynamically provision on demand. For large-scale network applications whose data rapidly grows, these limitations can render RDBMS an unsuitable tool for storing data.

Alternatives to the relational database model are now emerging to address these scalability issues. These alternatives are often referred to as cloud databases, non-relational distributed databases or "NoSQL" databases. Some examples include Google's® BigTable solution and Amazon's® SimpleDB solution. Non-relational data store are implemented differently by different vendors. Some non-relational data stores, for instance, store data as simple key-value pairs. Other non-relational data stores take a more table-oriented or column-oriented approach to storing data. Still others provide a document-oriented approach for storing data, for example, by storing data in a document conforming to the JSON or XML specifications.

SUMMARY

In certain embodiments, systems and methods for providing structured query language (SQL) access to non-relational data stores are provided. SQL access can be provided to a non-relational data store in one embodiment by mapping storage attributes of the data store to one or more virtual relational tables. The virtual tables can include a schema representation of data stored in a non-relational data store without actually including the data in the virtual tables. In some embodiments, these systems and methods therefore advantageously merge certain benefits of relational database architectures with the scalability benefits of certain non-relational data store architectures. Certain features of the systems and methods described herein can also be used with existing relational databases. For example, the systems and methods described herein can perform join or similar operations between a relational table in one data store and a data object in another data store.

The systems and methods described herein can be implemented by a computer system comprising computer hardware. The computer system may include one or more physical computing devices, which may be geographically dispersed or co-located.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

The features of embodiments of the inventions disclosed herein are described below with reference to the drawings. Throughout the drawings, reference numbers are re-used to indicate correspondence between referenced elements. The drawings are provided to illustrate embodiments of the inventions described herein and not to limit the scope thereof.

FIG. 11A illustrates an example non-relational data object.

FIG. 11B illustrates an embodiment of an entity-relationship diagram derived by mapping the non-relational data object of FIG. 11A to a relational data object.

FIGS. 16A-16E illustrate embodiments of entity-relationship diagrams derived by mapping various example non-relational data objects to relational data objects.

DETAILED DESCRIPTION

I. Introduction

A common trait among many non-relational data stores is lack of SQL-based access. More specialized programming can therefore be required to access the data in these databases. As a result, those without a programming background can find it difficult to access data stored in these databases. Other non-relational data stores (SimpleDB for example) provide some SQL functionality. However, these offerings tend to provide a very limited subset of SQL and are therefore likely to be unable to meet non-trivial specifications.

This disclosure describes systems and methods for providing SQL-based access to non-relational data stores. SQL access can be provided to a non-relational data store by mapping storage attributes of the data store to one or more virtual relational tables. The virtual tables can include a schema representation of data stored in a non-relational data store without actually including the data in the virtual tables. In some embodiments, these systems and methods therefore advantageously merge certain benefits of relational database architectures with the scalability benefits of certain non-relational data store architectures. Certain features of the systems and methods described herein can also be used with existing relational databases. For example, the systems and methods described herein can perform join or similar operations between a relational table in one data store and a data object in another data store (including a non-relational data object).

II. SQL for NoSQL System Overview

Figure 1A:
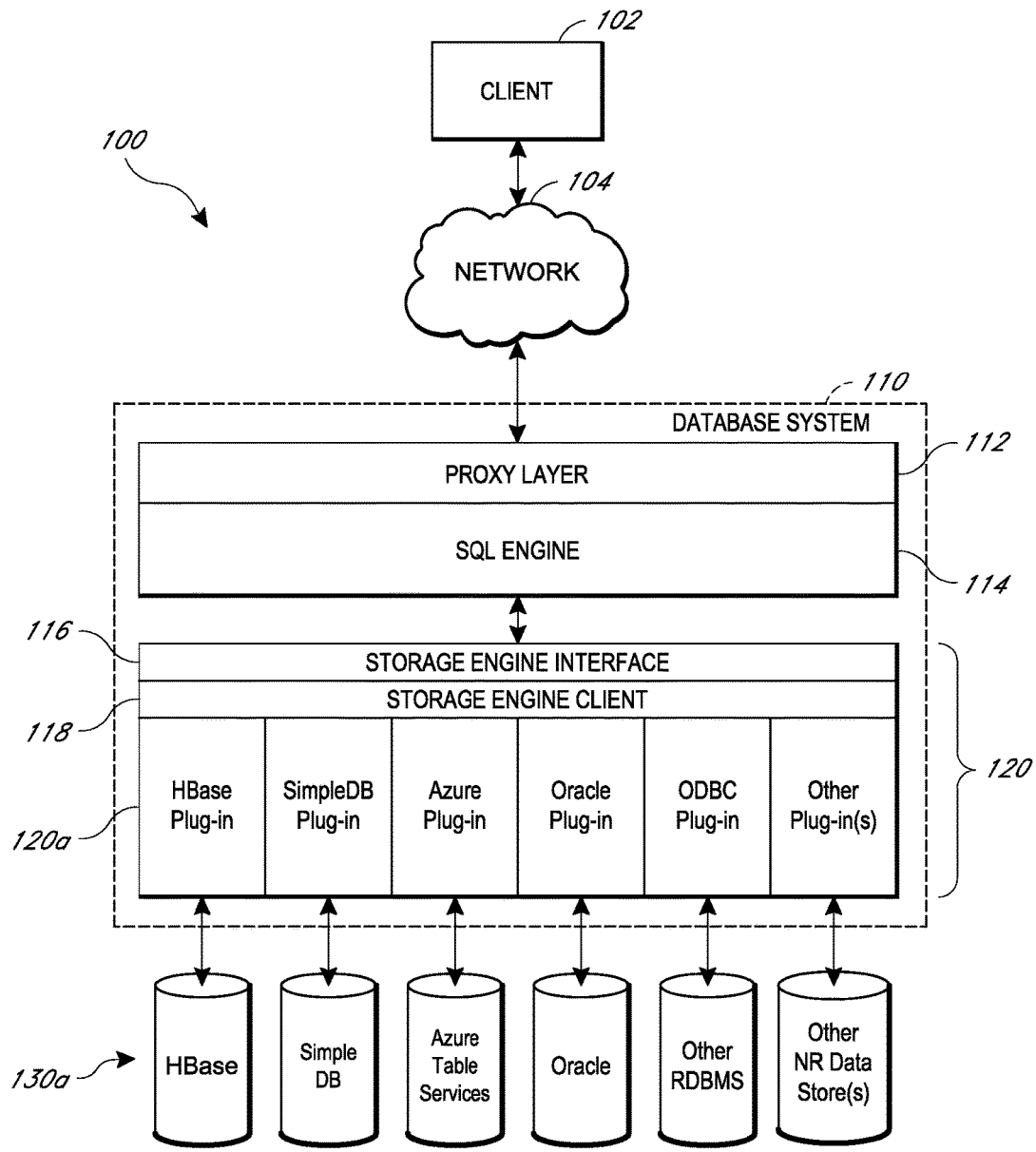
FIG. 1A illustrates an embodiment of a computing environment for providing users with SQL access to non-relational data stores.

FIG. 1A depicts an embodiment of a computing environment 100 for providing SQL-based access to non-relational data stores. In the depicted embodiment, a client 102 communicates with a database system 110. The client 102 and database system 110 can be implemented on the same or different computing machines. In one embodiment, the client 102 accesses the database system 110 over a network 104 such as a LAN or a WAN (e.g., the Internet).

The client 102 can be implemented in one or more physical computing machines. For example, the client 102 can be a desktop, laptop, tablet, wireless handheld device (such as a smartphone or PDA), or the like. The client 102 can include software for enabling a user to interact with the database system 110. For instance, the client 102 can generate one or more user interfaces that enable the user to query the database system 110 with SQL. In one embodiment, the client 102 provides an integrated development environment (IDE) for constructing SQL statements, user views, reports, and the like.

The database system 110 can also be implemented in one or more physical computing devices, such as any of the devices described above with respect to the client 102. In one embodiment, the database system 110 includes one or more servers, which may be geographically co-located or geographically dispersed (e.g., in different data centers). The database system 110 can also be implemented using one or more virtual machines. The database system 110 (and/or client 102) can also be implemented in a shared resources environment, such as a cloud computing environment or the like. For example, the database system 110 can be implemented as a machine instance or virtual machine running on a cloud computing platform, such as the Amazon Elastic Computer Cloud (EC2) provided by Amazon Web Services™.

Figure 1B:
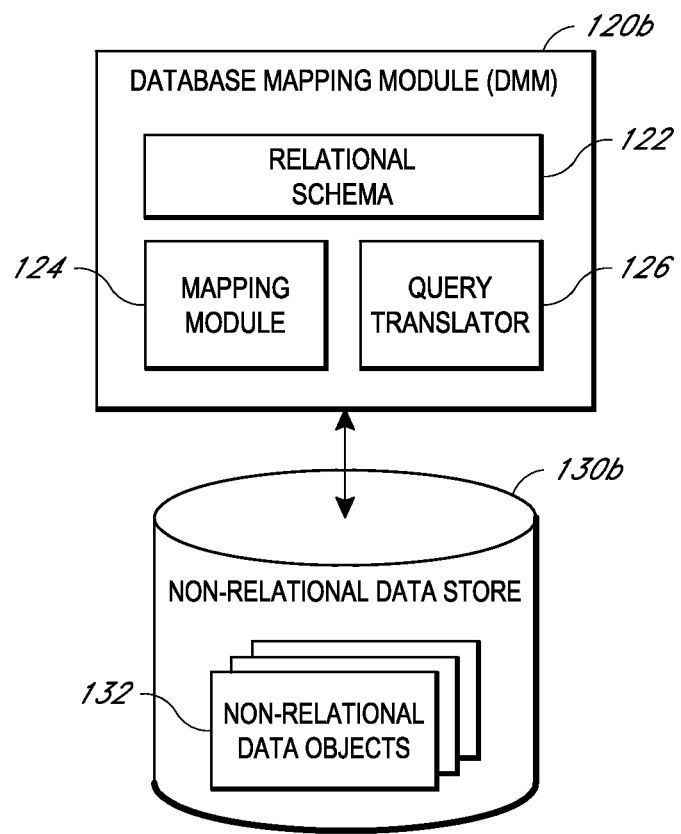
FIG. 1B illustrates an embodiment of a database mapping module.

In certain embodiments, the database system 110 includes features for mapping non-relational data stores (130a) to relational schema (see FIG. 1B). Once a data store 130a has been mapped, the database system 110 can translate SQL statements received from the client 102 into a format for accessing the data store 130a. As shown, the database system 110 includes a proxy layer 112, a SQL engine 114, and a storage engine 120 including several plug-ins 120a. In the depicted embodiment, the client 102 can access the database system 110 through the proxy layer 112. In certain embodiments, the proxy layer 112 pre-processes SQL statements received from the client 102. For example, the proxy layer 112 may split or divide a SQL statement that accesses multiple back-end data sources into separate SQL statements tailored for each specific source. The proxy layer 112 can also analyze the SQL in order to determine query optimizations that may improve performance. The proxy layer 112 can also perform certain dynamic, on-the-fly processing functions (described below with respect to FIG. 9).

In certain embodiments, the proxy layer 112 provides pre-processed SQL statements to a SQL engine 114. The SQL engine 114 can be a module that generates a query execution plan for each SQL statement. The query execution plan can include information on what algorithm to use to execute the SQL statement, which indices to access, and so forth. From this execution plan, the SQL engine 114 generates a set of execution plan instructions. The SQL engine 114 can provide these execution plan instructions to the storage engine 120 via a storage engine interface.

The storage engine 120 can be a module that communicates with one or more back-end data stores 130a, such as non-relational data stores. A storage engine interface 116 of the storage engine 120 can include an API that allows the SQL engine 114 to communicate the execution plan instructions to the data stores 130a. The storage engine 120 also includes a storage engine client 118 that provides access to configuration data about the data stores 130a. Configuration data stored by the storage engine client 118 can include connectivity information regarding how to connect to a data store 130a. This connectivity information can include, for example, network connectivity information such as IP address, URL, port, and so forth, web service interface information (such as SOAP, XML, and/or WSDL interfaces), and the like. Further, the configuration data can reflect the data store(s) 130a that each plug-in 120a communicates with. When a plug-in 120a is initially added to the database system 110, the storage engine 120 can provide functionality for the plug-in 120a to register with the storage engine client 118 to establish this configuration data.

In one embodiment, the storage engine client 118 receives the execution plan instructions from the storage engine interface 116 and selects one or more plug-ins 120a to send the instructions to based on the configuration data. The plug-in 120a can then translate the instructions into one or more API calls, other remote procedure calls, web service calls, REST calls, or the like to one or more data stores 130a.

Several plug-ins 120a are shown in FIG. 1. Each plug-in 120a can be designed to communicate with one or more different data stores 130a. Some example non-relational data stores 130a are shown, including Apache™ Hadoop HBase, Amazon® SimpleDB™, and Azure Table Services™. Other examples of non-relational data stores that may be included in certain implementations can include, among others, HyperTable, MongoDB, CouchDB, MemcacheDB, Megastore/GAE, Cassandra, Voldemort, Tokyo Cabinet, Dynamo, Dynamite, BigTable, Scalaris, Persevere, and Redis. The non-relational data store 130a can also include business intelligence data sources, file systems, flat file databases, or other data repositories.

Certain plug-ins 120a can also communicate with relational databases. For example, a plug-in 120a is shown for communicating with Oracle. An ODBC plug-in 120a can also be provided for communicating with other relational databases via the Open Database Connectivity (ODBC) API. By providing functionality for communicating with relational databases as well as non-relational data stores, the plug-ins 120a can facilitate merging, joining, exporting, or combining data from both relational and non-relational data sources. As shown, additional (or fewer) plug-ins 120a to other data stores 130a can also be provided.

In one embodiment, the database system 110 includes some or all the features of the MySQL® RDBMS. The plug-ins 120a can therefore be table handlers and/or storage engines that interface with the MySQL® engine. However, the database system 110 is not limited to MySQL® implementations and can be used in conjunction with other database management systems, such as PostgreSQL™ (also known as Postgres), or as a stand-alone database system independent of any currently-available commercial or non-commercial database platforms.

The example database system 110 architecture shown can also be varied considerably in other implementations. For example, the database system 110 could map one or more non-relational and/or relational data stores to one or more relational tables without employing a plug-in or storage engine architecture. The proxy layer 112 may also likewise be optional in some embodiments.

FIG. 1B illustrates an embodiment of a database mapping module (DMM) 120b. The DMM 120b can be implemented as one of the plug-ins 120a described above. Thus, the DMM 120b can include any of the features of the plug-ins 120a and vice versa. The DMM 120b can also be used by a database system that does not implement a plug-in architecture. For ease of illustration, the remainder of this application will refer primarily to the DMM 120b rather than the plug-ins 120a; however, it should be understood that any of the features described herein can be implemented by the plug-ins 120a of FIG. 1A.

In the depicted embodiment, the DMM 120b includes a relational schema 122, a mapping module 124, and a query translator 126. Each of these components can be implemented in software and/or hardware. Further, the DMM 120b is shown in communication with a non-relational data store 130b. The non-relational data store 130b is a more detailed example of the non-relational data stores 130a described above.

The non-relational data store 130b includes non-relational data objects 132. Different types of data objects 132 can exist for different types of non-relational data stores 130b. For instance, data objects 132 in a column-oriented non-relational data store 130b can be tables, albeit non-relational (or partially-relational) ones. Data objects 132 in a document-oriented non-relational data store 130b can be documents or subdocuments. Data objects 132 in a key-value non-relational data store 130b can be key-value pairs or hash tables. The data objects 132 can also be considered tuples or sets of tuples in some implementations.

The mapping module 124 can map a data object 132 in the non-relational data store 130b to a relational schema 122 or logical layer representing a relational or quasi-relational structure of the data object 132. In one embodiment, the mapping module 124 generates the schema 122 by making API calls or other calls to the non-relational data store 130b to determine a data object's 132 structure, including storage attributes of the data object 132. These storage attributes can include column names, document names, key names, data types, constraints, and the like, depending on the type of non-relational data store 130b.

The mapping module 124 can use the storage attributes to create a schema 122 that includes one or more logical relational tables. These tables can include relational representations of the storage attributes of a non-relational data object without actually including a copy of the data in the data object. For example, a mapping module 124 might determine that a non-relational data store includes comma-delimited data. The mapping module 124 can then map columns in the comma-delimited data to columns in one or more logical tables. In other embodiments, the mapping module 124 can create physical tables that copy the data of the data object as well as logical tables, for example, if a local copy of the data is desired to speed data access.

Advantageously, in certain embodiments, the schema-generating capability of the mapping module 124 facilitates discovery of the structure and contents of a non-relational data store. Many non-relational data stores 130b do not include a data dictionary or catalog describing the data stores' contents. The mapping module 124 can scan each data object 132 in a data store 130b to determine its contents and can create a corresponding data dictionary or catalog. Further, the mapping module 124 can also be used to facilitate data migrations between data stores (e.g., from a non-relational data store to a relational database).

Once the mapping module 124 has created the relational schema 122, the query translator 126 can receive and translate SQL execution plan instructions into calls that access the data objects 132 in the non-relational data store 130b. For example, referring to FIG. 1A, the mapping module 124 can expose the schema 122 to the SQL engine 114. The SQL engine 114 can in turn expose the schema 122 as a set of one or more logical tables to a user via the client's 102 user interface. The user can then construct ad hoc SQL queries on the tables. In certain embodiments, the relational schema 122 can support a partial or full subset of SQL, including Data Query Language (DQL), Data Manipulation Language (DML), Data Definition Language (DDL), and/or Data Control Language (DCL).

To illustrate, some SQL commands that may be supported, which may not typically be supported by a non-relational data store, can include joins, set operations (e.g., unions or the like), order by commands, group by commands, and sub-queries. Further, by virtue of the mapping module 124 creating a data dictionary in some embodiments, the query translator 126 can also support metadata or data dictionary operations such as listing tables, listing columns in tables, and the like.

Referring again to FIG. 1B, the query translator 126 can respond to low-level data access requests generated by the SQL query processor in the SQL engine 114 of FIG. 1A. For instance, part of the SQL execution may request that an individual record (e.g., a row, document, or key-value pair) in the data object 132 be retrieved. The query translator 126 can translate this request into the appropriate low level API calls or other calls to satisfy the request. As an example, the SQL execution may request that the entire data set of a data object 132 be returned (akin to a full table scan in relational terminology). The query translator 126 can translate that request into the appropriate API calls that fetch the requested data from the data object 132.

III. Mapping Embodiments

Figure 2:
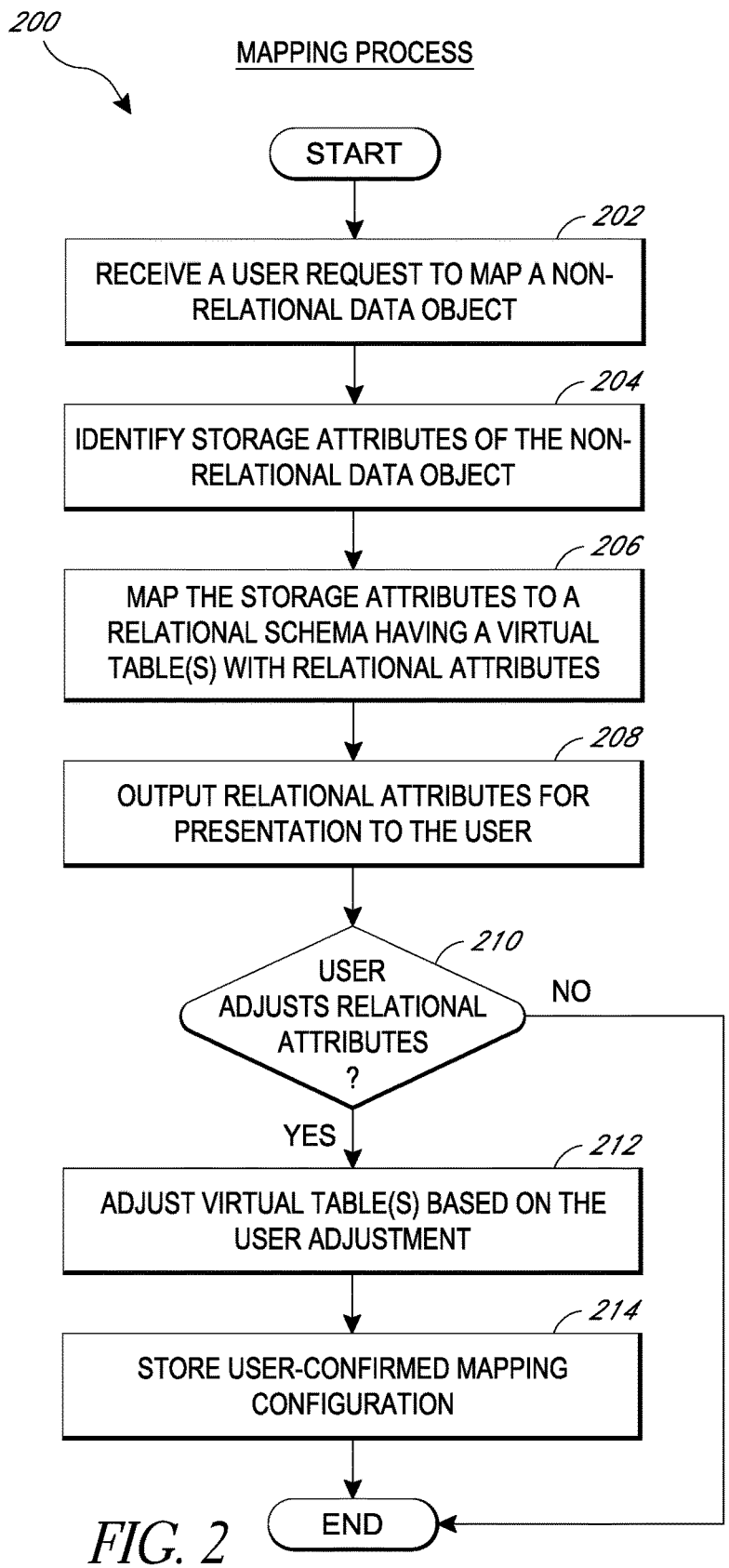
FIG. 2 illustrates an embodiment of a mapping process for mapping a non-relational data object to a relational data object.

FIG. 2 illustrates an embodiment of a mapping process 200 for mapping a non-relational data object to a relational data object or schema. For ease of illustration, the mapping process 200 will be described as being implemented by the mapping module 124. However, it should be understood that the mapping process 200 can be implemented by other systems or components, including the plug-in 120*a* described above.

Figure 3:
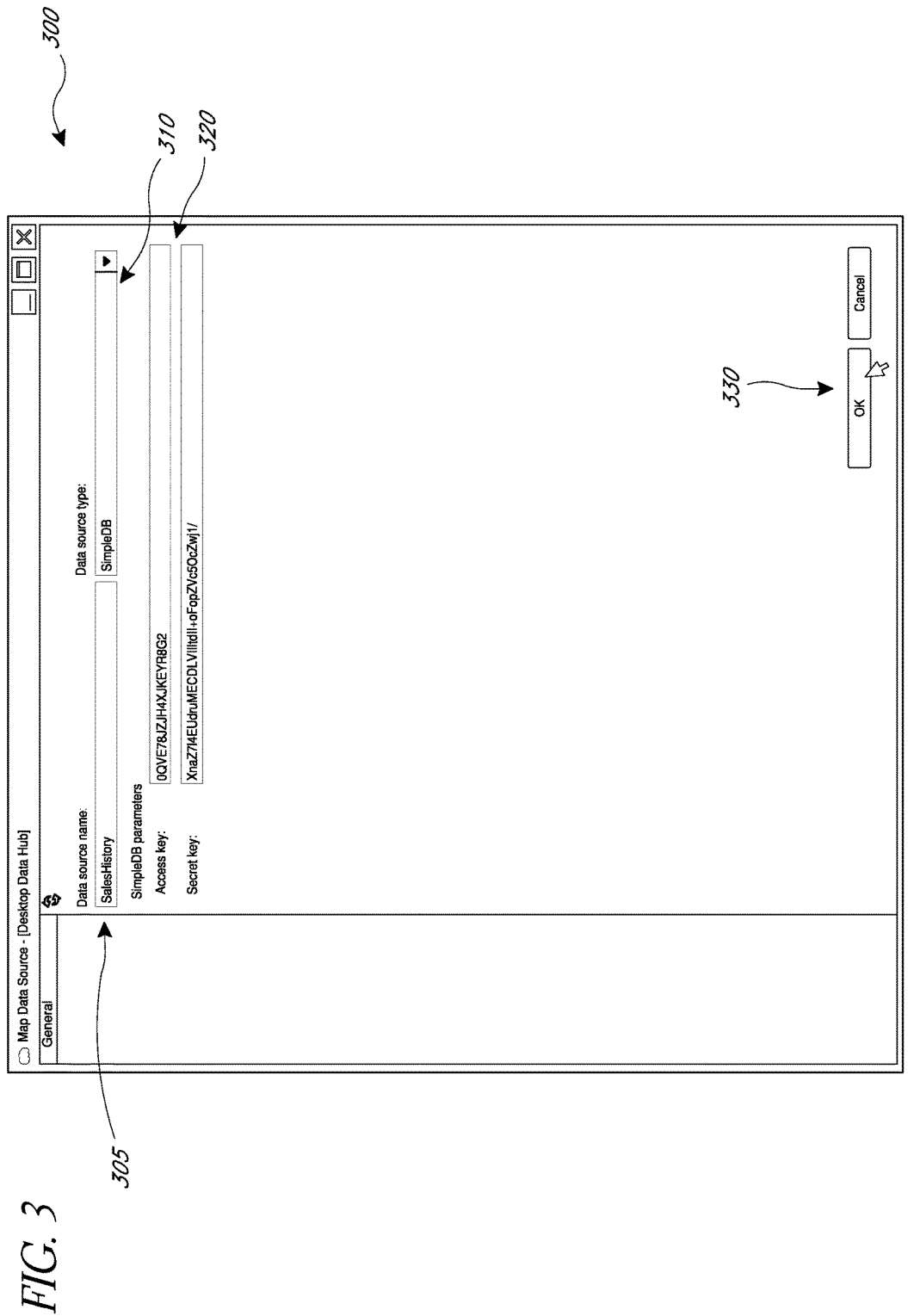
FIGS. 3 through 5 illustrate embodiments of user interfaces for mapping a non-relational data object to a relational data object.
Figure 4:
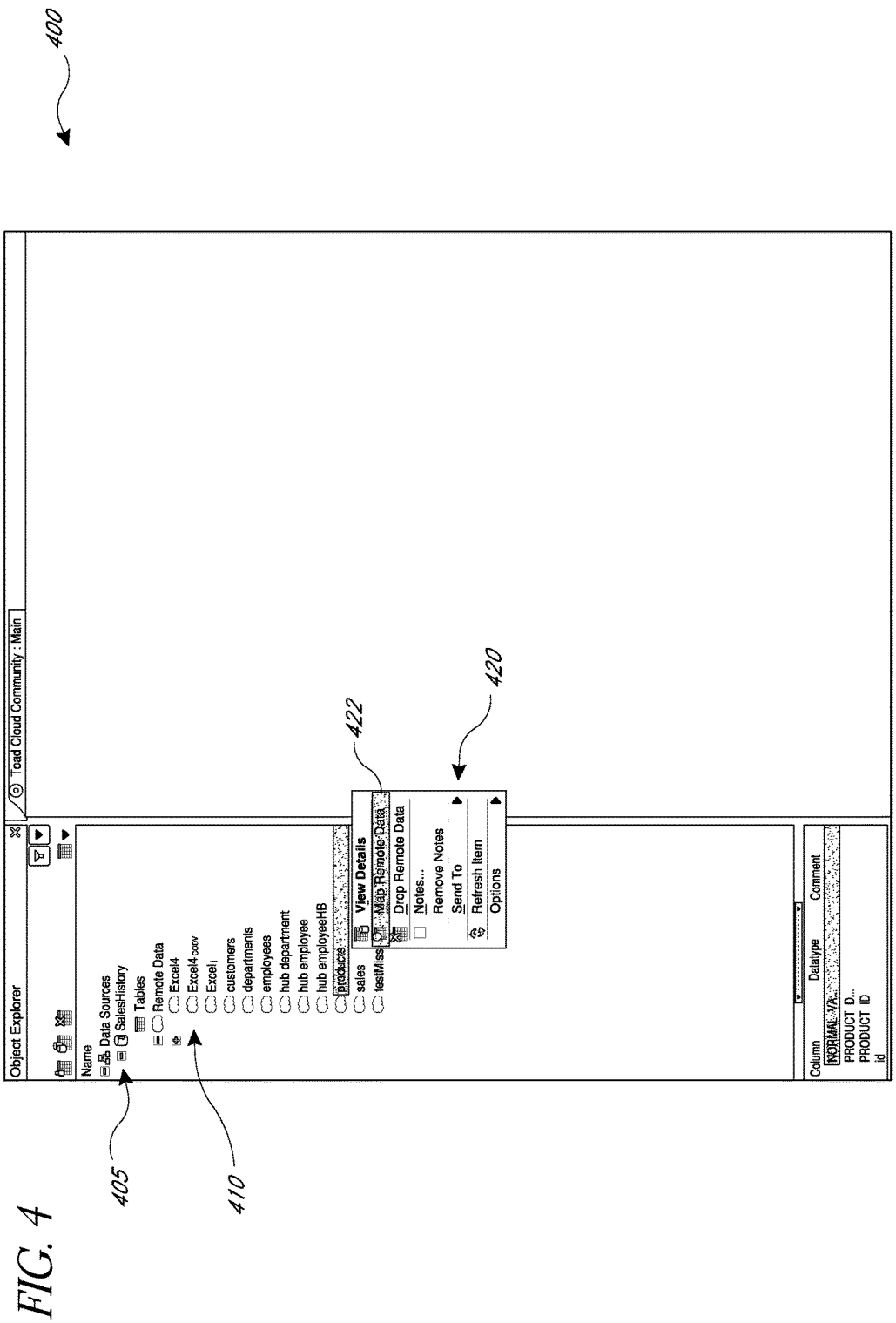
Figure 5:
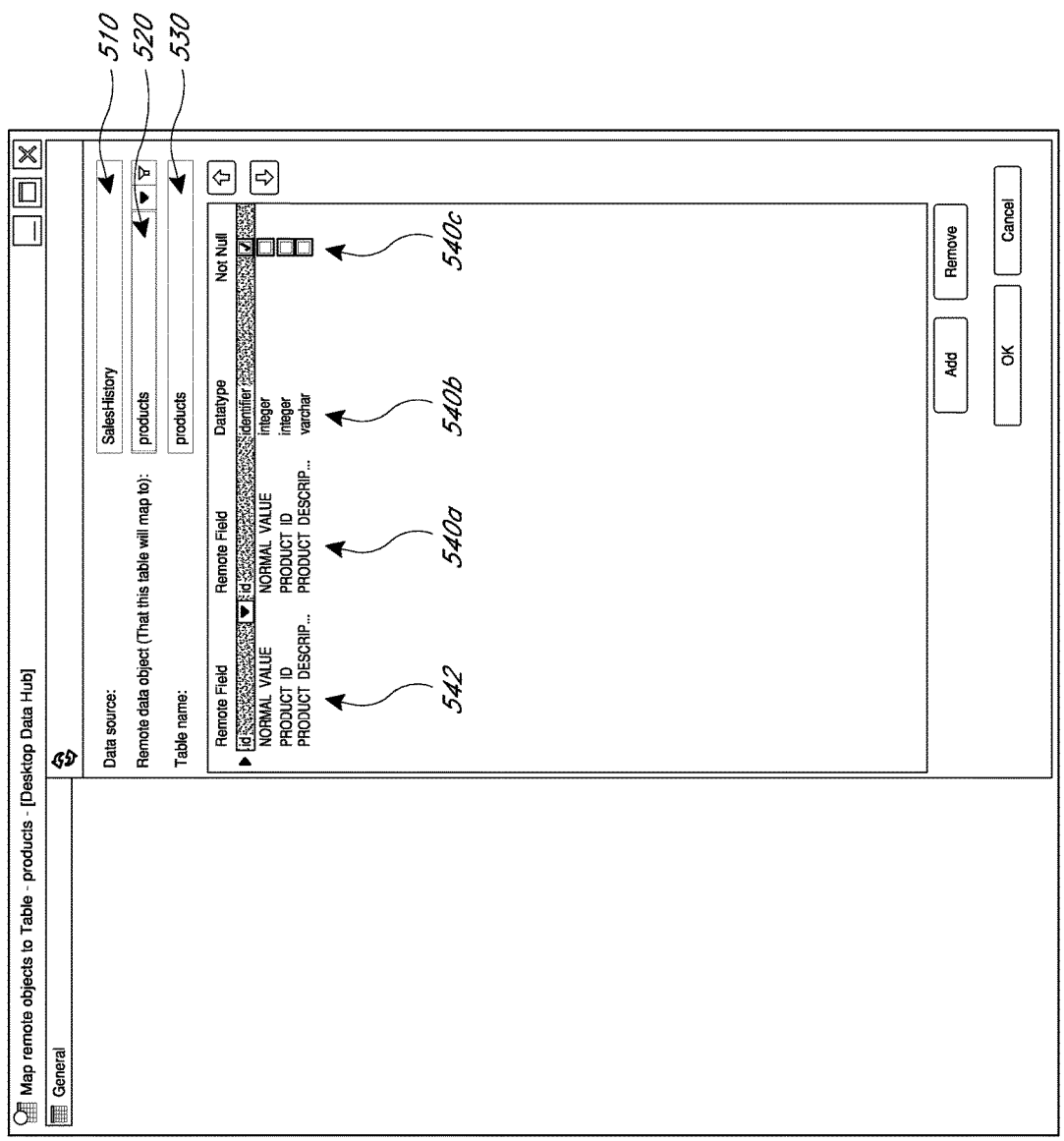

The mapping process 200 will also be described in the context of example user interfaces 300-500 shown in FIGS. 3 through 5. These user interfaces 300-500 can be implemented by the client system 102 or can be output for access by the client 102 by the database system 110. For example, the user interfaces 300-500 can be web pages or user interfaces output by an application other than a browser.

With continued reference to FIG. 2, the mapping process 200 begins at block 200, where the mapping module 124 receives a user request to map a non-relational data object. This request can be generated by a user of the client 102 described above. The request can include details regarding a particular non-relational data store that a user wishes to map the data object from, where the user wishes the mapped relational schema to be formed, and so forth.

As an example illustration, FIG. 3 depicts a user interface 300 for mapping a data source or data store, which can include one or more data objects. In the user interface 300, fields 305, 310 are provided for specifying a name of the data source and its type, respectively. The type of data source in the field 310 (shown as a drop-down box in the depicted embodiment) can be a type of non-relational data store. In the example user interface 300 shown, the data source is a SimpleDB data store (310) named SalesHistory (305). Also provided are authentication parameters 320, including an access key and secret key, for accessing the data store. User selection of a submission button 330 can cause the mapping module 124 to identify the data objects stored in the SalesHistory data store/source (block 204 of FIG. 2).

Once the data objects in the data store or source are identified, the mapping module 124 may present a user interface to the user, such as the example user interface 400 shown in FIG. 4. In this user interface 400, the client 102 lists data objects 410 in the SalesHistory data source 405. The user can select one of the data objects 410, for example, by right-clicking on the data object 410. Upon selection of the data object 410 (entitled "products" in the FIGURE), a context menu 420 is depicted in the example embodiment. This context menu 420 includes an option 422 to map remote data in the selected data object to a relational schema. User selection of this menu option 422 can result in the mapping module 124 receiving the request to map the data object in block 202 of FIG. 2.

Referring again to FIG. 2, at block 204, the mapping module 124 identifies storage attributes of the data object. These storage attributes can include names of columns in a column-oriented data object, names of documents or fields in a document-oriented data object, or key names in a key-value data object. For ease of illustration, the remainder of this specification will refer to column-based storage attribute examples (except with respect to FIGS. 16A-16E), although some or all of the features described herein can be applied to both document and key-value data stores. The mapping module 124 can further identify additional information about the storage attributes, such as whether they represent static identifiers of data or dynamic data themselves. Storage attributes, including static and dynamic attributes, are described in greater detail below with respect to FIGS. 10 through 16E.

At block 206, the mapping module 126 maps the data attributes to a relational schema having virtual table(s) with relational attributes. The virtual table (or tables) can be a logical table that stores column names, data types, and/or constraints without storing the actual data in the data object. Thus, the virtual table can store metadata rather than the data in one embodiment. The mapping module 124 can assign the column names in the virtual table placeholder or dummy names based on the names of storage attributes identified from the data object. Further, if the storage attributes do not specify data types or constraints, the mapping module 124 can infer these data types or constraints. For example, if a column in the data object includes strings, the mapping module 124 could assign the column a temporary data type of "varchar." Similarly, if the mapping module 124 identifies records or rows in the data object that are missing data in a particular column, the mapping module 124 can identify that column as allowing NULL values.

The mapping module 124 can output the relational attributes for presentation to the user at block 208. As an example, the user interface 500 in FIG. 5 illustrates several relational attributes 540 for the "products" data object 520 selected from the SalesHistory data source 510 in FIG. 4. The mapping module 124 has assigned placeholder names to the relational attributes 540. Further, the mapping module has assigned a placeholder name to a relational table generated from the data object. As indicated in the field 530, this table name can be changed by a user. Similarly, the relational attributes 540 can be changed by the user. For reference, the names of fields or storage attributes 542 in the data object are also shown.

At block 210 of FIG. 2, the mapping module 124 determines whether the user has adjusted the relational attributes. Referring again to FIG. 5, the user can rename a column 540*a*, choose whether to map a column 540*a* (e.g., by deselecting a column, it becomes unmapped), change a data type 540*b*, or change a constraint 540*c*. If the user adjusts one of these relational attributes 540, the mapping module 124 adjusts the virtual table(s) based on the user adjustment at block 212 in FIG. 2. Further, at block 214 of FIG. 2, the mapping module 124 stores a user-confirmed mapping configuration, including the adjusted relational attributes, in physical computer storage. Storing the mapping configuration can enable the query translator 126 to execute SQL queries on the data object (see, e.g., FIG. 6).

IV. Query Processing Embodiments

Figure 6:
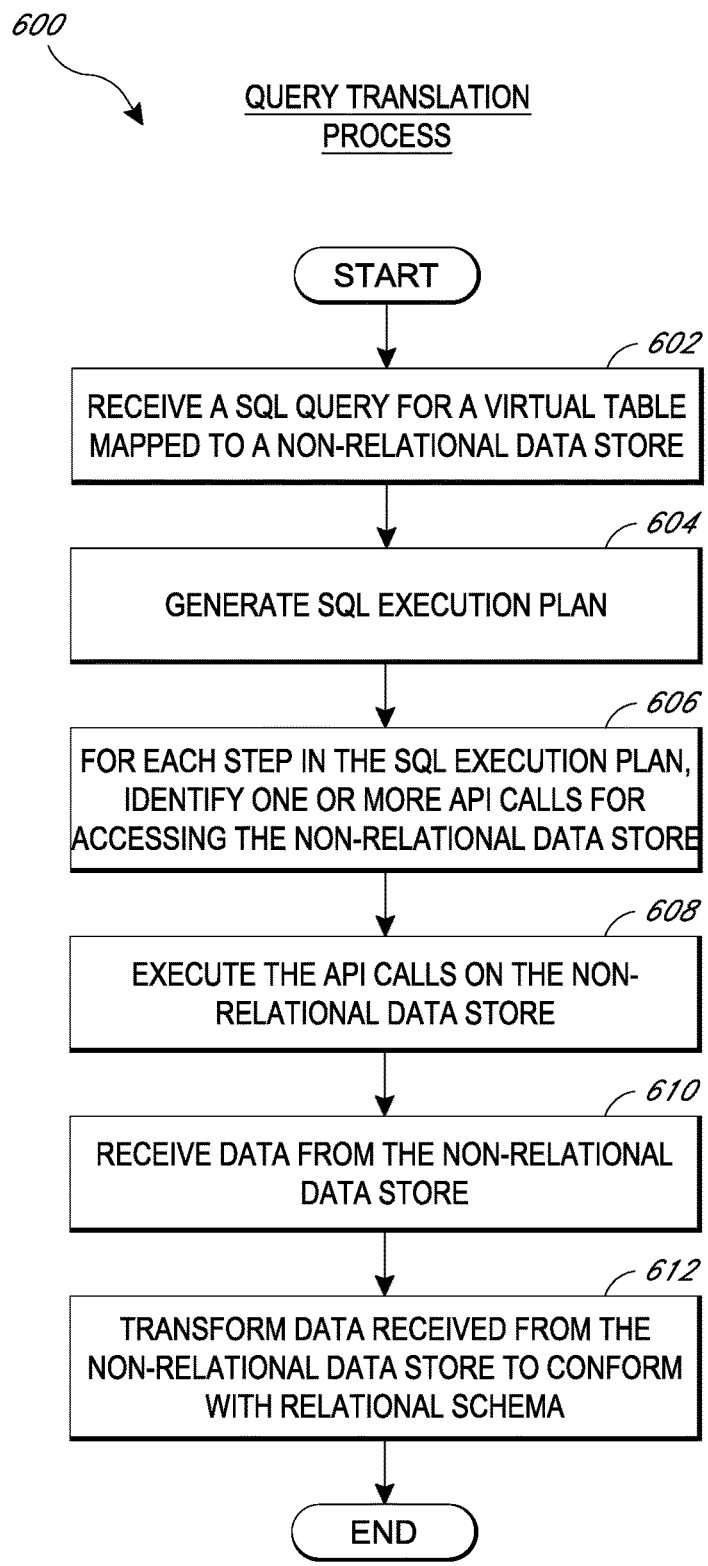
FIG. 6 illustrates an embodiment of a translation process for translating a SQL query to application programming interface (API) calls on a non-relational data store.

FIG. 6 illustrates an embodiment of a query translation process 600 for translating a SQL query to API calls or other calls on a non-relational data store. For ease of illustration, the query translation process 600 will be described as being implemented by components of the database system 110 and the DMM 120b, including the query translator 126. However, it should be understood that the query translation process 600 can be implemented by other systems or components, including the plug-in 120a described above.

Referring to FIG. 6, the query translation process 600 begins at block 602, where the proxy layer 112 of the database system 110 of FIG. 1 receives a SQL query for a virtual table mapped to a non-relational data store. In some cases, the SQL query may include sub-queries or multiple statements intended for different data stores. The proxy layer 112 can divide the SQL query into these sub-queries or the like and assign the different queries to the different data stores. The functionality of the proxy layer is described above with respect to FIG. 1A and in greater detail below with respect to FIG. 9.

At block 604, the SQL engine 114 generates a SQL execution plan for the SQL query. The SQL execution plan includes a number of instructions or steps to be executed on the relational schema or virtual tables mapped to the non-relational data store. The query translator 126 can receive the execution steps from the SQL engine 114. For each step in the SQL execution plan, at block 606, the query translator identifies one or more API calls or other calls for accessing the non-relational data store. The query translator 126 then executes the API calls or other calls on the non-relational data store at block 608.

The query translator 126 receives data from the non-relational data store at block 610. This data may be received in a non-relational format. At block 612, the query translator 126 transforms this data to conform to the relational schema or mapping configuration generated by the mapping module 124. For example, the query translator 126 can format the data according to one or more virtual tables that were generated by the mapping module 124 and stored as a mapping configuration as described above with respect to FIG. 2. The query translator 126 may use different transformation techniques for different types of non-relational data stores, examples of which are described in further detail below. Further, in some embodiments, server-side programming or scripting can be used to at least partially transform the data into relational format on the non-relational data store itself.

Figure 7:
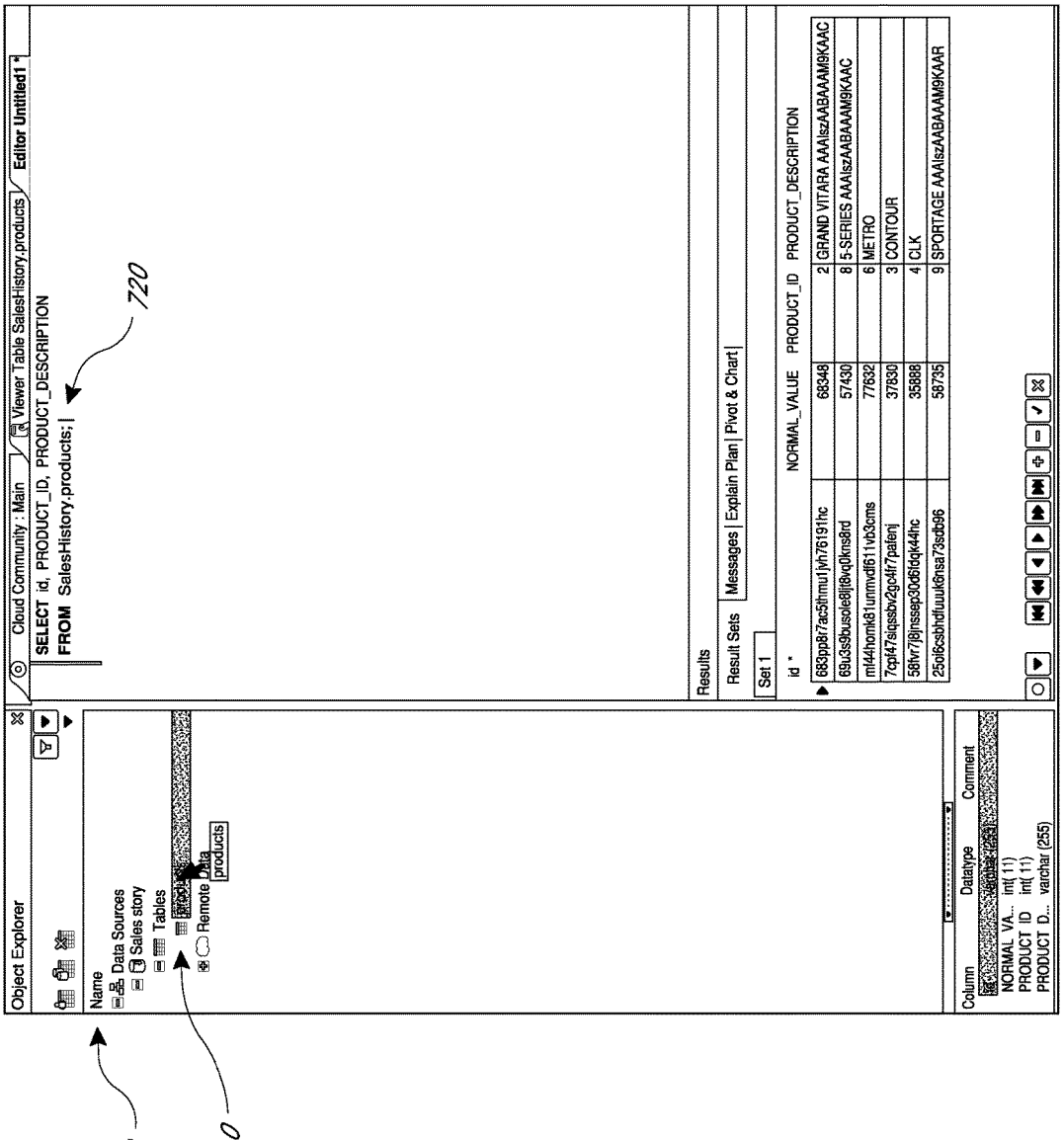
FIGS. 7 and 8 illustrate embodiments of user interfaces for querying a non-relational data object using SQL.
Figure 8:
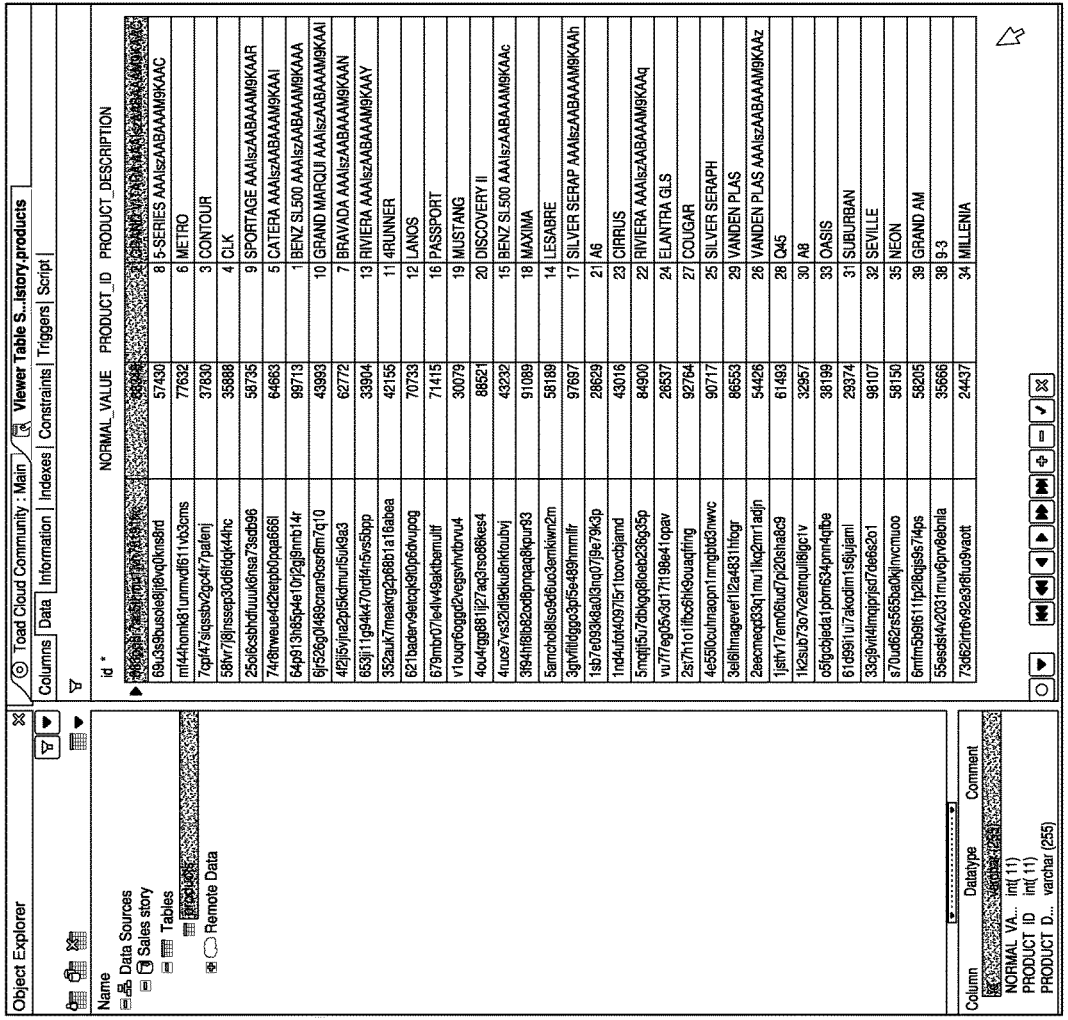

FIGS. 7 and 8 illustrate embodiments of user interfaces 700, 800 for querying a non-relational data object using SQL. The user interfaces 700, 800 can be implemented by the client system 102 or can be output for access by the client 102 by the database system 110. For example, the user interfaces 700, 800 can be web pages or user interfaces output by an application other than a browser.

Referring to FIG. 7, the example user interface 700 shown includes the "products" table 710 mapped earlier for the SalesHistory data source (see FIGS. 3-5). A SELECT query 720 has been created using the user interface 700 to select data from the products table 710. Partial results 730 of the query are shown in the user interface 700, and additional results 830 are shown in the user interface 800. Although not shown in FIGS. 7 and 8, the client 102 can provide automatic query-building functionality for users to create queries instead of manually typing in SQL statements.

Figure 9:
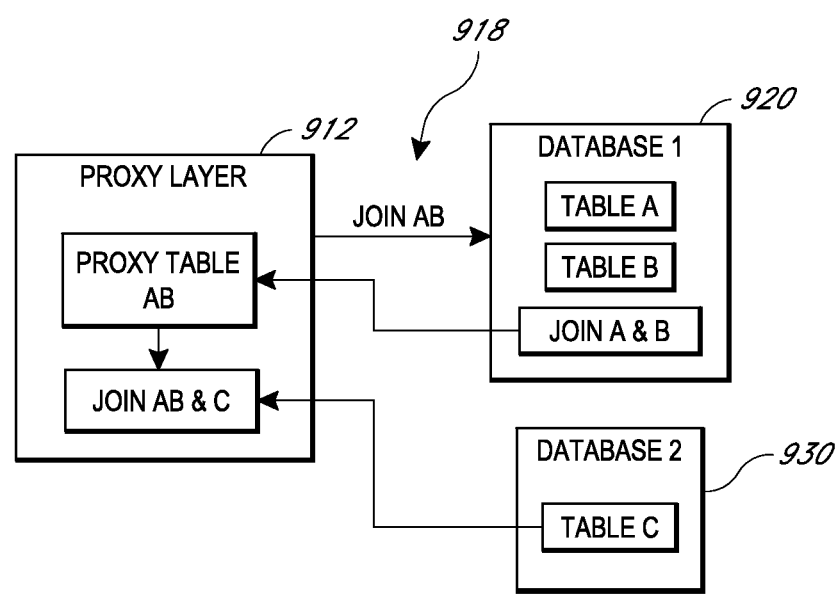
FIG. 9 illustrates an embodiment of a proxy layer of a database system that can push down joins or other SQL operations to a remote data store.

FIG. 9 illustrates an embodiment of a proxy layer 912 of a database system. In certain embodiments, the database system 110 described above can join tables from multiple databases 920 and 930, including relational and/or non-relational data stores. The proxy layer 912 of the database system can improve join performance by performing dynamic, on-the-fly join processing. This dynamic processing can include the creation of one or more proxy tables, hash indexes, or the like, as will be described below.

Without the proxy layer 912, joins and other SQL statements that combine data can use network resources or other computing resources inefficiently. For example, if a database system joined tables from multiple databases or non-relational data stores, the database system might request the entire tables (or other data objects) from the data stores and join the tables within the database system 110. In this approach, significant network resources can be consumed when retrieving multiple tables or data objects for the join operation.

Some data stores are capable of performing optimizations for joining data sets, and the proxy layer 912 can leverage this capability to improve join performance. For instance, the Hive™ non-relational database system that interfaces with the Hadoop™ storage system is capable of performing massively parallel join operations which execute across an entire Hadoop cluster, which may include hundreds or even thousands of machines. The proxy layer 912 can leverage these capabilities to cause joins to be performed by the data stores whenever possible.

In certain embodiments, the proxy layer 912 sends or pushes down a join command 918 to a first database 920 to join two tables A and B (or data objects). Essentially, instead of the database system 110 directly performing the join operation, the proxy layer 912 can pass the join command to the first database 920. The first database 920 can then join these tables A & B and return the joined table AB to the proxy layer 912. In response, the proxy layer 912 dynamically creates a proxy table AB. The proxy table AB can contain the joined data from tables A and B. Because the database 920 performed the join, less data may be transferred over a network between the database 920 and the proxy layer 912 of the database system 110.

Optionally, the proxy layer 912 may also join the proxy table AB with one or more additional tables. For example, another table C from a second database 930 can be joined with the proxy table AB. In addition, the proxy layer 912 can elect not to perform a push-down join in some cases even when it is available. If the tables on the remote database 920 are not large, for instance, the proxy layer 912 might perform a join locally at the database system 110 instead of in the remote database 920 to avoid loading the remote database server or servers.

In addition to performing dynamic joins, the proxy layer 912 can also perform data access optimization to improve or optimize the querying of joined tables. For instance, the proxy layer 912 can create a hash index of the joined tables AB and/or of the proxy table AB to speed up queries of the joined or proxy tables.

Further, the proxy layer 912 can access metrics about data store size and contents in the storage engine client's 102 configuration data (see FIG. 1) to determine whether a SQL statement will fetch several rows (or other large amounts of data) from a data store. If a large amount of data will be accessed, the proxy layer 912 can provide instructions to the DMM 120b (or plug-in 120a) to obtain and cache the rows or an entire table or data object. The configuration data maintained by the storage engine client 102 can also include pseudo-tables or other metadata that represents the organization of the remote data stores. The proxy layer 912 can also manipulate the pseudo-tables to cause changes to be made directly to tables in the data stores.

V. Normalization Embodiments

When creating a relational schema from a non-relational data object, the mapping module 124 can normalize or partially normalize the data object. Since many non-relational data stores include data objects that are not normalized according to relational techniques, normalization of such data objects can allow relational, SQL queries to be performed on the data objects. More generally, the mapping module 124 can restructure the data in the data object to allow for efficient SQL queries, which restructuring can include normalization, among other techniques. Normalization can be part of the mapping process described above with respect to FIG. 2, such as block 206 of FIG. 2.

Figure 10:
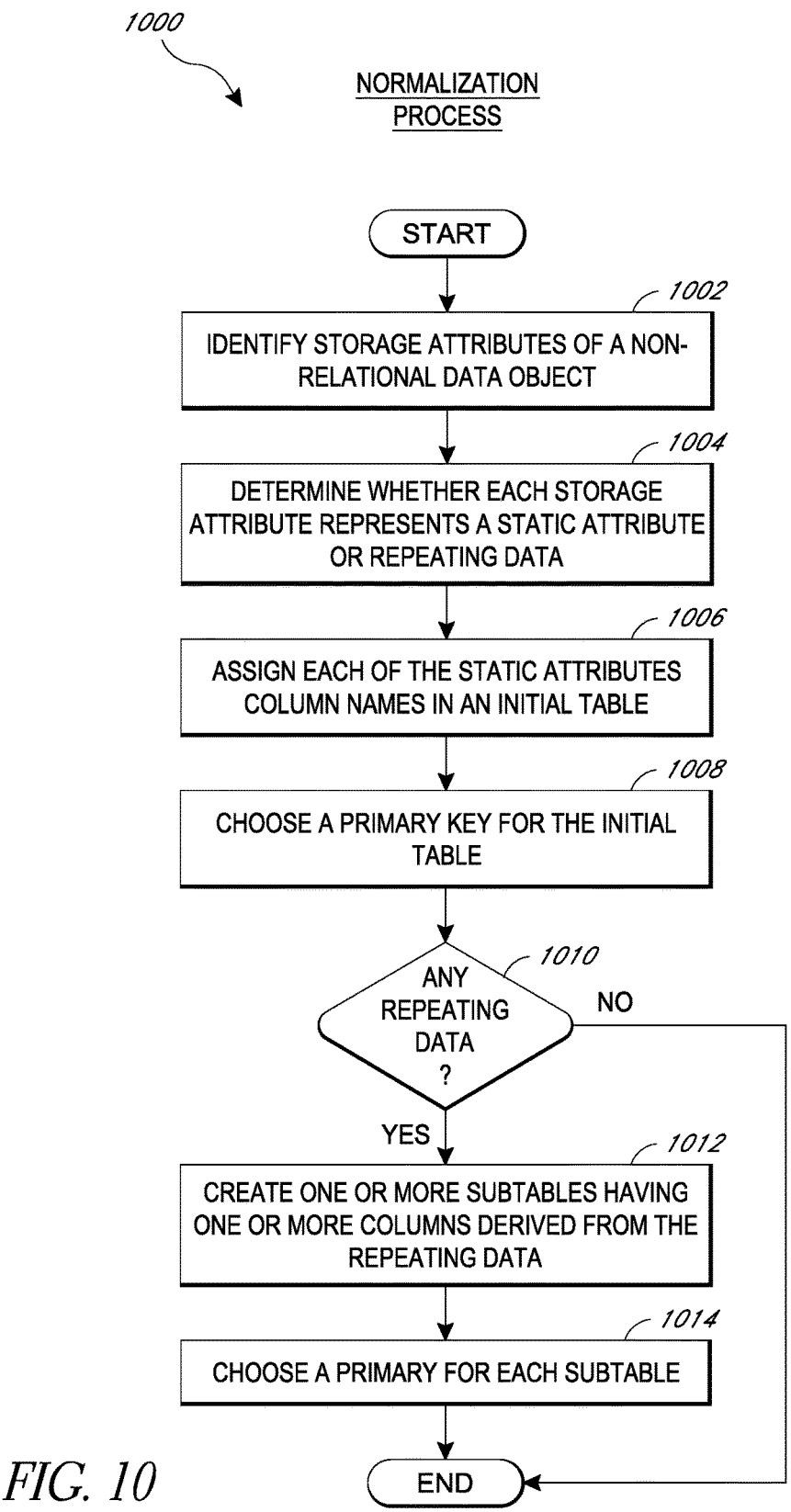
FIG. 10 illustrates an embodiment of a normalization process for normalizing a non-relational data object to one or more relational data objects.

Normalizing the data object can include putting the data object in first normal form, second normal form, third normal form, or a higher normal form. First normal form can include selecting a primary key and eliminating or reducing repeating data, for example, by creating a subtable for each repeating attribute. FIG. 10 illustrates an example embodiment of a normalization process 1000 that implements at least first normal form for a non-relational data object. Second normal form can also be performed on the data object by eliminating or reducing partial dependencies so that non-key attributes are functionally dependent on the entire primary key. Moreover, third normal form can also be performed by eliminating or reducing transitive dependencies, such that non-key attributes depend only on the primary key. The mapping module 124 can perform normalization, including identifying repeating data, using a heuristic process that may differ for different types of non-relational data stores.

In FIG. 10, the normalization process 1000 is described as being implemented by the mapping module 124. However, it should be understood that the normalization process 1000 can be implemented by other systems or components, including the plug-in 120a described above. The normalization process 1000 is a more detailed embodiment of aspects of the mapping process 200 of FIG. 2.

The process 1000 begins at block 1002, where the mapping module 124 identifies storage attributes of a non-relational data object. As described above with respect to FIG. 2, these storage attributes can include names of columns in a column-oriented data object, names of documents or fields in a document-oriented data object, or key names in a key-value data object, among other attributes.

At block 204, the mapping module 124 can determine whether each storage attribute represents a static attribute or repeating data. Static attributes can be static identifiers of columns, such as "first name" for a column of people's names. The mapping module 124 can identify static attributes by determining that a name for a column does not change for different rows or records in the data object. Continuing with the previous example, each row in a data object may have a "first name" column name that does not change for different rows. The first name column may therefore be a static attribute.

The mapping module 124 assigns column names in an initial table to each of the static attributes at block 1006. Thus, the mapping module 124 can map each static attribute in a one-to-one correspondence to a column in a relational table, such as a virtual table or the like. The mapping module 124 chooses a primary key for this initial table at block 1008. The mapping module 124 can choose the primary key by identifying one or more columns that are indicated as key columns or identification (or "id") columns in the data object. If no such indication is provided, the mapping module 124 can select one or more columns that uniquely identify each row or, alternatively, can create a unique identifier as the primary key.

At block 1010, the mapping module 124 determines whether the data object includes any repeating attributes. The mapping module 124 can identify repeating attributes by detecting column names in the data object that include dynamic data instead of static identifiers. Dynamic data can occur in some non-relational data stores that implement column families or other meta-column data. A column family can contain one or more columns of related data. Different types of column families can exist in different types of non-relational data stores. Some non-relational data stores include both static and dynamic column families. The static column families can include the same number of related columns for each row or record in the data object. Dynamic column families can include a different number of columns for each row or record in a data object. In addition, super column families are available in some data stores, such as the Cassandra non-relational data store, which allow further groupings of static and dynamic data. Super column families are described in greater detail below with respect to FIGS. 13 through 15.

A column family example will now be described with respect to FIG. 11A. In FIG. 11A, an example data object or table 1100 is shown. The table 1100 is a simplified version of tables that may be found in the Hadoop HBase™ database and other similar column-oriented non-relational data stores. In the table 1100, a row key 1110 column is provided that includes unique identifies for each row 1102 in the table 1100. If the normalization process 1000 of FIG. 10 were implemented on this table 1100, the mapping module 124 may select this row key 1110 as the primary key at block 1008. Next to the row key 1110 are two column families 1120, 1130, including a "person column family" 1120 and a "web_sites column family" 1130. The person column family 1120 includes two static attributes or column names 1122, including a "first_name" column and a "last_name" column. In contrast, the web_sites column family 1130 includes dynamic attributes or column 1132. These dynamic attributes 1132 include the names of web sites visited by each user (for each row 1102), as well as a number of visits made by the user to each web site (such as 33 visits to www.facebook.com for user John Smith).

As can be seen in FIG. 11, the number of columns 1132 in the dynamic web_sites column family 1130 differs for each row 1102 because different users visit different web sites. This dynamic column family structure can improve scalability in very large distributed databases. However, each column 1132 in the web_sites column family 1130 actually includes repeating data of the attribute "web sites visited by a user" and "a number of visits to each web site." As such, in order to normalize the table 1100, the mapping module 124 can move or pivot this repeating data to another table.

Referring again to FIG. 10, the mapping module 124 can identify the repeating data at block 1010 in a number of ways. For instance, the presence of a column family can be a factor that indicates the possible existence of repeating data. However, some databases include column families (such as the "person" column family 1120 in FIG. 11A) that have columns that are merely static identifiers rather than repeating data. Thus, while in some cases the mapping module 124 can identify repeating data merely by detecting the presence of a column family, in other instances the mapping module 124 conducts further analysis to determine whether the column family includes repeating data.

One way that the mapping module 124 can detect repeating data within a column family is to determine whether a different number of columns exist for different rows or records in the table. As can be seen in FIG. 11A, for example, a different number of columns 1132 exist in the web_sites column family 1130 (two for user "1" and three for user "2"), indicating the possible presence repeating data. Similarly, the mapping module 124 can also detect repeating data by observing rows that have different column names but the same number of columns. The mapping module 124 can distinguish column families with repeating data from column families with static attributes that allow nulls. A static column family that allows nulls may have the same number of columns for each row, even though some of the data in those columns are null and thus appear to be different from other rows.

With continued reference to FIG. 10, if the mapping module 124 detects no repeating data at block 1010, the normalization process 1000 ends, having created just the initial table (similar to the mapping process 200). However, if the mapping module 124 detects repeating data, at block 1012, the mapping module 124 creates one or more subtables having one or more columns derived from the repeating data. In effect, the mapping module 124 can pivot an attribute associated with repeating data into its own table, which may be a child or subtable of the initial table created above. Said in another way, the mapping module 124 can move the repeating data in the table into one or more additional tables. While normalizing, the mapping module 124 can generate a relationship between the first table (a parent or initial table) and the new table (child table), for example, by creating a foreign key in the child table that corresponds to a primary key in the parent or initial table. At block 1014, the mapping module 124 also chooses a primary key for each subtable created. The primary key can include the foreign key as well as one or more other columns derived from the repeated data.

With a non-relational data store normalized, users can perform table joins and other SQL queries on the normalized tables. However, since the normalized tables may not actually exist in the non-relational data store, in certain cases an actual join or SQL query may not be executed. Rather, the query translator 126 described above can effectively denormalize the normalized schema in response to receiving a join request (or other SQL requests). This denormalization can include translating the join request (or other SQL request) into one or more API calls to the non-relational data store.

FIG. 11B illustrates an example entity-relationship diagram 1150 that may be derived by mapping the non-relational table 1100 of FIG. 11A to relational tables 1160, 1170. In FIG. 11B, the mapping module 124 has created a person table 1160, which includes the id (row key), first_name, and last_name columns from the table 1100. This person table 1160 is an example of an initial or parent table created from the static column names 1122 in the static person column family 1120. The mapping module 124 has selected the "id" column as the primary key for the person table 1160, as indicated by bold font.

The mapping module 124 has also created a web_sites child or subtable 1170 corresponding to the dynamic web_sites column family 1130. The web_sites table 1170 includes the id column as a foreign key to the person table 1160. The web_sites table 1170 also includes a web_site column and a no_of_visits (number of visits) column. The web_site column corresponds to the repeating web site data in the web_sites column family, and the no_of_visits column corresponds to the repeating visit counts data in the web_sites column family. In one embodiment, the mapping module 124 initially creates placeholder names for these column names (e.g., based on the column family name) and can allow a user to adjust the column names as well as their other attributes, such as data type and any constraints.

Figure 12:
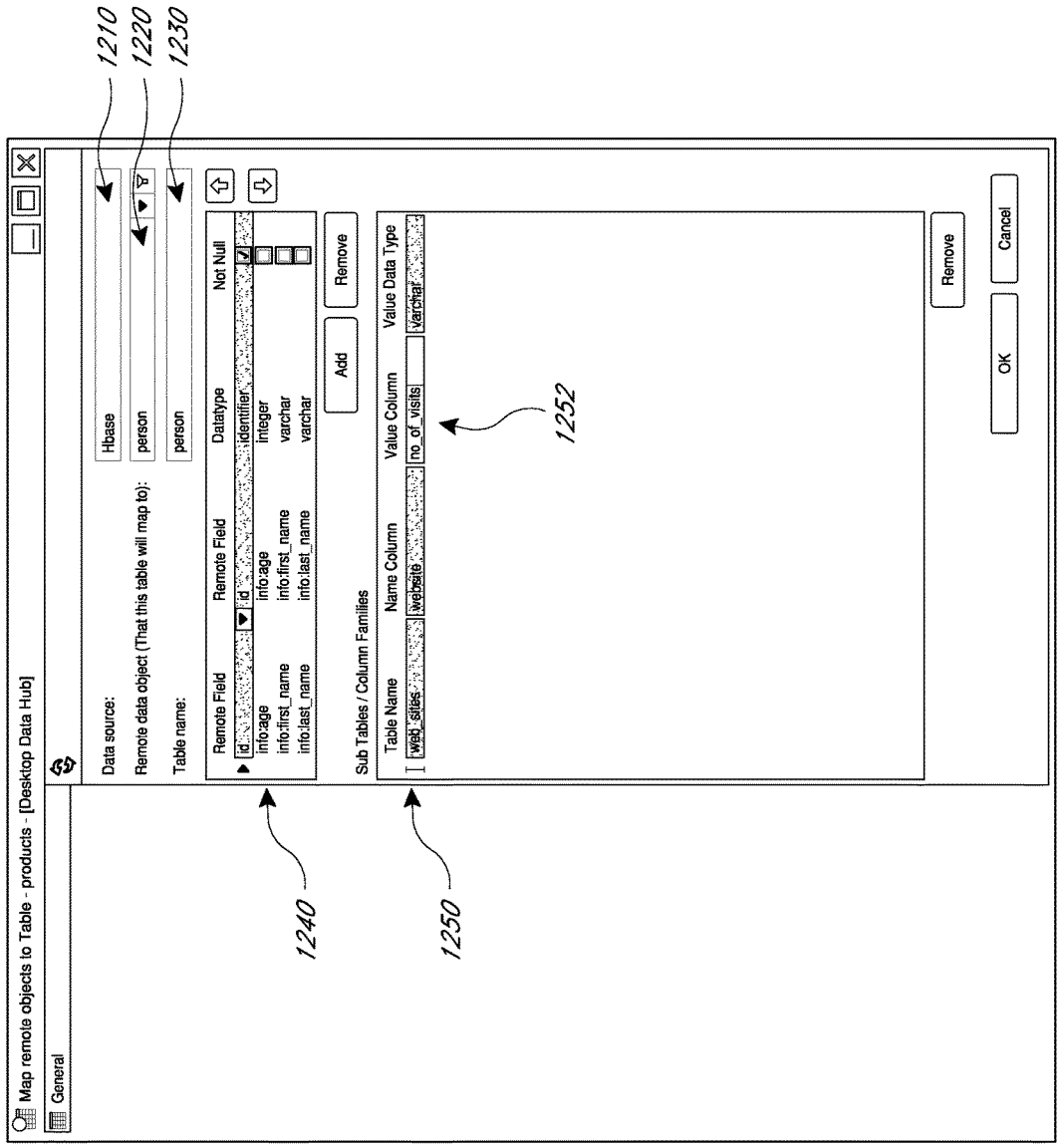
FIG. 12 illustrates an embodiment of a user interface for mapping the non-relational data object of FIG. 11A to a relational data object.

For example, FIG. 12 illustrates an example user interface 1200 that reflects the mapping performed from the table 1100 of FIG. 11A to the relational tables 1160, 1170 in FIG. 11B. Similar to the user interface 500 of FIG. 5, the user interface 1200 depicts a data source 1210, data object 1220, table name 1230, and storage attributes 1240 of a table that has been mapped. This mapped table corresponds to the initial or parent table 1160 described above. In addition, the user interface 1200 depicts storage attributes 1250 of a subtable corresponding to the web_sites column family 1130 of FIG. 11A. The storage attributes 1250 include column attributes, which the user can customize (see, e.g., column 1252) by renaming, by adjusting their data type, or by specifying constraints (such as not NULL).

Figure 13:
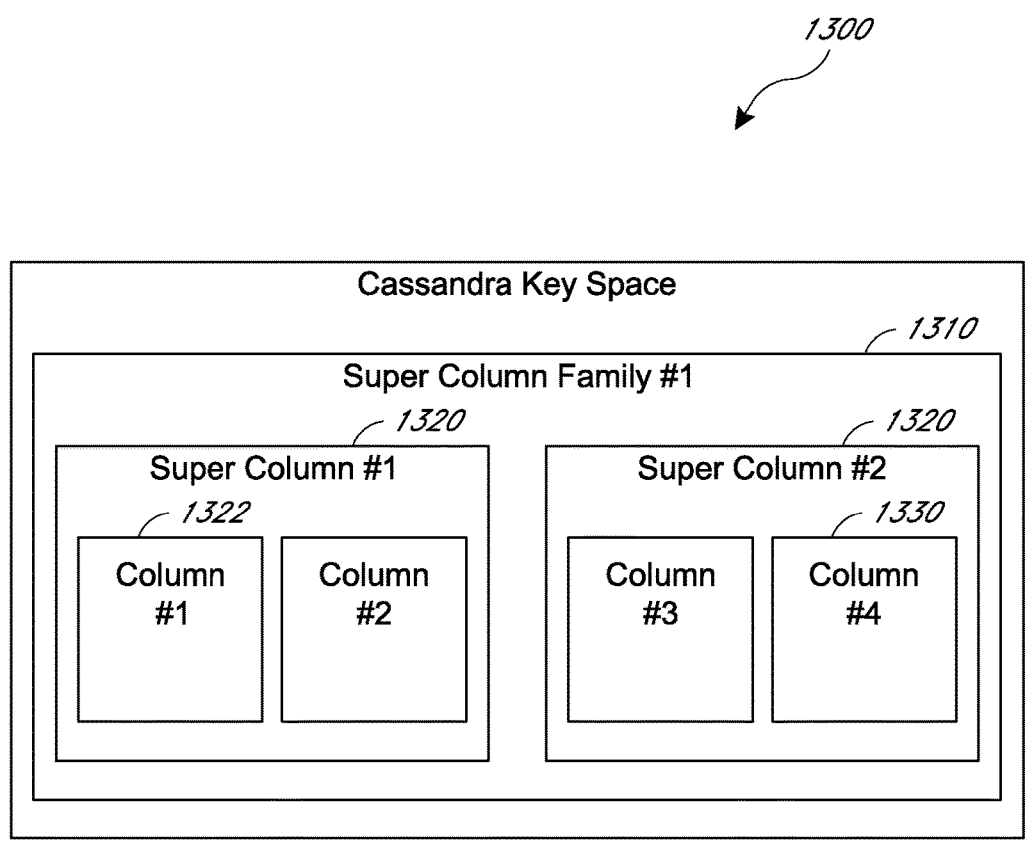
FIG. 13 illustrates an example non-relational data object structure for a Cassandra non-relational database.

FIG. 13 illustrates an example non-relational data object structure 1300 for a non-relational data store that includes super columns, such as may be found in Cassandra databases. Cassandra and other similar data stores have two different types of column families. These include standard column families, which may contain static and dynamic columns, and super column families, which are like HBase column families with additional flexibility. The data object structure 1300 shown includes a super column family 1310 (of which there may be multiple), super columns 1320 nested within the super column family 1310, and columns 1330 nested within the super columns 1320.

In the HBase-related column family examples described above (see FIG. 11A, 11B), the column family names are static identifiers, much like the column names in a relational table. However, other data stores such as Cassandra take the problem of normalizing column families to a whole new level of difficulty by allowing the column family names to also be dynamic data instead of static identifiers. The problem here is that both the names of the super columns 1320 and those of the columns 1330 can be either static identifiers or dynamic data. This gives several different permutations that can be mapped differently by the mapping module 124.

In each of the different data patterns, the mapping module 124 can show the super column family 1310 as a remote data object, which is mapped to a main (or parent) table. The mapping module 124 can map super columns 1320 that have dynamic names or contain columns 1330 with dynamic names as sub-tables. Note that two or more of these patterns may appear in the same super column family 1310, resulting in multiple sub-tables being defined in the mapping process.

Figure 14A:
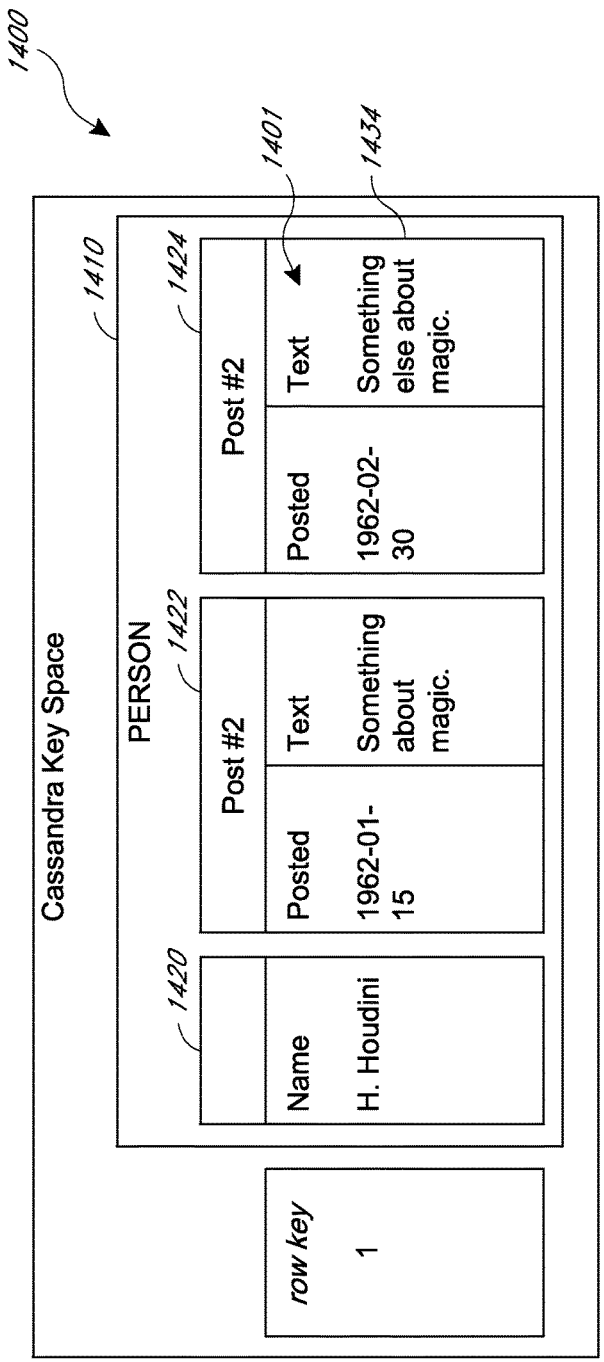
FIG. 14A illustrates another example of a non-relational data object.

FIGS. 14A through 15B illustrate various examples of super column families being mapped to relational tables. Referring to FIG. 14A, a non-relational data object 1400 is shown, which is one example permutation or pattern of the Cassandra data object structure 1300 described above. The data object 1400 includes a super column family 1410 that includes a static super column 1420 and two dynamic super columns 1422 and 1424.

This data object 1400 pattern is used where there is a group of the same repeating columns and where the super column names are multiple instances of the same data entity. For example, in the data object 1400, each of the dynamic super columns 1422, 1424 represents a separate posting in a person's blog. The format of each post, however, is consistent and repeats the same set of columns 1432, 1434 with the same static identifiers as the column names 1440.

Figure 14B:
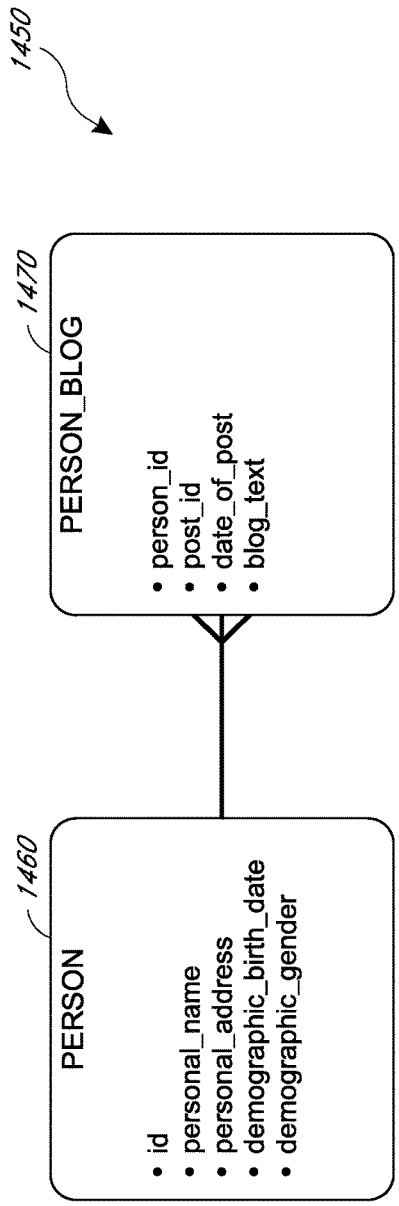
FIG. 14B illustrates an embodiment of an entity-relationship diagram derived by mapping the non-relational data object of FIG. 14A to a relational data object.

FIG. 14B illustrates an example entity-relationship diagram 1450 including tables 1460, 1470 that can be derived by mapping the non-relational data object 1400 of FIG. 14A to relational data objects. This mapping can be performed by the mapping module 124. The tables 1460, 1470 include a parent person table 1460 reflecting data included in the static super column 1420 and a person_blog subtable 1470 including attributes of the dynamic super columns 1422, 1424.

For the data object 1400 pattern shown in FIG. 14A, the mapping module 124 can pivot both the columns 1432, 1434 and the dynamic super column 1422, 1424 themselves to create rows in the sub-table 1470. Because the columns 1432, 1434 of the dynamic super columns 1422, 1424 are static, they become additional columns in the subtable 1470 as shown in FIG. 14B (e.g., date_of_post and blog_text), rather than columns in a third subtable. As with the example shown in FIG. 12 above, the mapping module 124 can output a user interface that enables a user to rename any columns in the tables 1460, 1470, change their data types, and/or update any constraints.

Figures 15A, 15B:
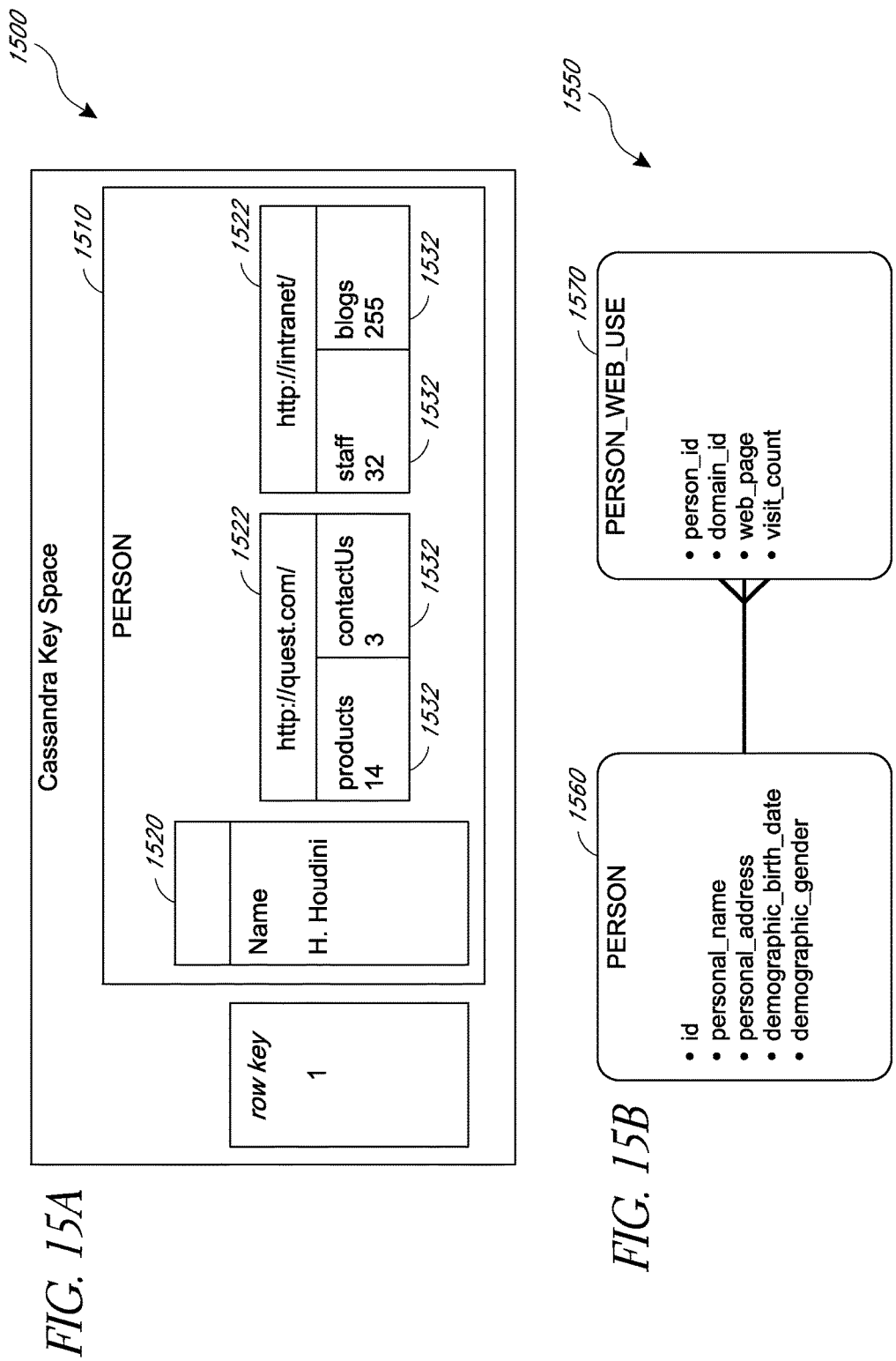
FIG. 15A illustrates another example of a non-relational data object.
FIG. 15B illustrates an embodiment of an entity-relationship diagram derived by mapping the non-relational data object of FIG. 15A to a relational data object.
Figure 16E:
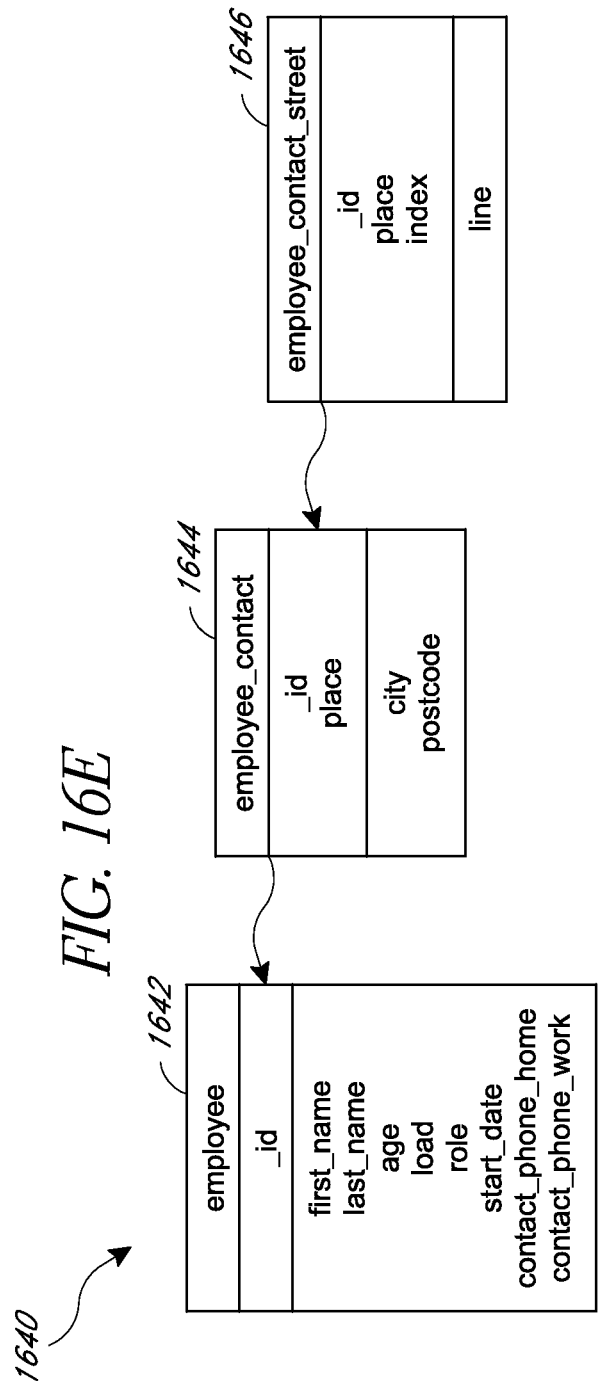

FIG. 15A illustrates another example of a non-relational data object 1500 that reflects a different pattern or permutation of super column families. The data object 1500 includes a super column family 1510 that includes a static super column 1520 and two dynamic super columns 1522. Each dynamic super column 1522 includes dynamic columns 1532 instead of static identifiers as well. A potential use case for this pattern would be some form of data that is aggregated at two levels. FIG. 15A shows how web page visits by each person could be aggregated by the domain name (in the super column 1522 name), and by a relative page within that domain (in the column 1532 name).

FIG. 15B illustrates an example entity-relationship diagram 1550 including tables 1560, 1570 that can be derived by mapping the non-relational data object 1500 of FIG. 15A to relational data objects. This mapping can be performed by the mapping module 124. The tables 1560, 1570 include a parent person table 1560 reflecting data included in the static super column 1520 and a person_web_use subtable 1470 including attributes of the dynamic super columns 1522 and dynamic columns 1532. As with the example shown in FIG. 12 above, the mapping module 124 can output a user interface that enables a user to rename any columns in the tables 1560, 1570, change their data types, and/or update any constraints.

As described above with respect to block 610 of FIG. 6, data received from a non-relational data store can be transformed to conform to a relational schema generated by the mapping module 124. For column-oriented data stores having column families such as HBase and Cassandra, columns in a column family are often stored together in computer storage. The query translator 126 can therefore request an entire column family (or a subset thereof) from the non-relational data store as part of the SQL to non-relational query translation process. For each column family, the query translator 126 can determine which column names and values are included in the column family. For each column previously deemed to include repeating data, the query translator 126 can create a row of data, thereby pivoting the column to a row. The query translator 126 can repeat this process for other column families as well, thereby transforming a non-relational data object to a relational data object. The query translator 126 can also pivot super column families that include repeating data into rows.

It should be noted that for some column-oriented data stores (or for other data store types), such as HBase and Cassandra, sparses schemas may exist. In these sparse schemas, the number of columns can greatly exceed the data present in those columns. When fetching data from such a data store, the query translator 126 can identify any missing attributes in the SQL select list and provide nulls for those attributes. If the user provided a not null constraint for a given attribute but that attribute is actually null for a given row, the query translator 126 can output an error message such as a runtime exception to alert the user of the null.

FIGS. 16A through 16E illustrate additional embodiments of entity-relationship diagrams derived by mapping various example non-relational data objects to relational data objects. In these FIGURES, the relational mappings are derived from a document-oriented data store. The mapping module 124 or plug-in 120a can perform the mapping features described below. The mapping module 124 (or plug-in 120a) may employ similar techniques to normalize the document-oriented data store as were applied with the column-oriented data stores described above. For instance, the mapping module 124 can identify static attributes and repeating data and can move repeating data to one or more subtables.

The examples show in FIGS. 16A through 16E are described in the context of documents in a MongoDB database. MongoDB is one example of a document-oriented database, and the techniques described with respect to MongoDB can be applied to other document-oriented databases. In MongoDB and other databases, data objects include one or more documents. Each document can be described using XML or Java Standard Object Notation (JSON), or some other document description language. Each of the following examples uses JSON to illustrate document data objects. In the examples below, each document represents a record in a document data store and is delimited by curly brackets ({ }). Documents may also have nested subdocuments denoted by curly brackets or arrays denoted by brackets ([ ]). Subdocuments in MongoDB can be treated similarly as column families in column-oriented databases.

As an introductory example, the following collection of documents includes static data in subdocuments that can be mapped by the mapping module 124 directly to a relational table 1600 shown in FIG. 16A:

i MongoDB Example 1—Subdocuments

{
_id: "msmith",
first_name: "Miriam",
last_name: "Smith",
age: 36,
role: "Developer",
start_date: "1998-08-22",
phone: {
  home: "9575000",
  work: "3736000"
}
}
{
_id: "jharris",
first_name: "Jan",
last_name: "Haris",
age: 38,
load: 4.2,
role: "Manager",
start_date: "1998-03-01",
phone: {
  home: "5827001",
  work: "5758001"
}
}
{

```
_id: "esorenson",
first_name: "Ed",
last_name: "Sorenson",
age: 20,
load: 0.5,
role: "Developer",
start_date: "2009-03-23",
phone: {
   home: "8462002",
   work: "6382002"
}
}
{
_id: "pjackson",
first_name: "Peter",
last_name: "Jackson",
age: 33,
load: 0.1,
role: "Developer",
start date: "2008-04-01",
phone: {
   home: "4552003",
   work: "9562003"
}
}
```

Each document in this data object has a phone attribute, which is a subdocument containing home and work attributes. Since the attributes are always the same in this example, the mapping module 124 can map this data object to a single table, such as the following Employee Table 1 (see also the table 1600 in FIG. 16A):

| Employee Table 1 | | | | | | | | |
|---|---|---|---|---|---|---|---|---|
| _id | first_name | last_name | age | load | role | start_date | phone_home | hoMe_work |
| msmith | Miriam | Smith | 36 | null | Developer | 1998 Aug. 22 | 5755278 | 7365000 |
| jharris | Jan | Harris | 38 | 4.2 | Manager | 1998 Mar. 1 | 5827163 | 5758001 |
| esorenson | Ed | Sorenson | 20 | 0.5 | Developer | 2009 Mar. 23 | 8462841 | 6382002 |
| pjackson | Peter | Jackson | 33 | 0.1 | Developer | 2008 Apr. 1 | 4552759 | 9562003 |

However, the attribute names of sub-documents are not always so uniform, as is illustrated in the following example:

ii MongoDB Example 2—Non-Uniform Subdocument Attributes

```
{
_id: "msmith",
first_name: "Miriam",
last_name: "Smith",
age: 36,
role: "Developer",
start_date: "1998-08-22",
internet_usage: {
"http://blog.org": 46,
"http://groups.google.com": 152
}
}
{
_id: "jharris",
first_name: "Jan",
last_name: "Harris",
age: 38,
load: 4.2,
role: "Manager",
start_date: "1998-03-01",
internet_usage: {
   "http://www.amazon.com": 427
}
}
{
_id: "esorenson",
first_name: "Ed",
last_name: "Sorenson",
age: 20,
load: 0.5,
role: "Developer",
start_date: "2009-03-23",
internet usage: {
   "http://www.cplusplus.com": 230,
   "http://www.stackoverflow.com": 341
}
}
{
_id: "pjackson",
first_name: "Peter",
last_name: "Jackson",
age: 33,
load: 0.1,
role: "Developer",
start_date: "2008-04-01",
internet usage: {
   "http://thedailysoup.com": 517,
   "http://www.stackoverflow.com": 2010
}
}
```

Since the attributes of each internet_usage sub-document vary in this data object, the mapping module 124 can identify the internet_usage sub-document as including repeating data. The mapping module 124 can then move this repeating data to another table, creating a parent Employee Table 2 (table 1612 in FIG. 16B) and a subtable Employee_Internet_Usage (table 1614 in FIG. 16B). These tables are reproduced in full below. However, the mapping module 124, while normalizing data in the data object to create virtual tables, does not copy the data shown in the tables below to the database system 110 in some embodiments:

| Employee Table 2 | | | | | | |
|---|---|---|---|---|---|---|
| _id | first_name | last_name | age | load | role | start_date |
| msmith | Miriam | Smith | 36 | null | Developer | 1998 Aug. 22 |
| jharris | Jan | Harris | 38 | 4.2 | Manager | 1998 Mar. 1 |
| esorenson | Ed | Sorenson | 20 | 0.5 | Developer | 2009 Mar. 23 |
| pjackson | Peter | Jackson | 33 | 0.1 | Developer | 2008 Apr. 1 |

| Employee_Internet_Usage Table | | |
|---|---|---|
| _id | url | visits |
| msmith | http://blog.org | 46 |
| msmith | http://groups.google.com | 152 |
| jharris | http://www.amazon.com | 427 |
| esorenson | http://www.cplusplus.com | 230 |
| esorenson | http://www.stackoverflow.com | 341 |
| pjackson | http://thedailysoup.com | 517 |
| pjackson | http://www.stackoverflow.com | 2010 | iii MongoDB Example 3—Nested Subdocuments

The sub-documents and/or arrays in a document-oriented database can be nested to an arbitrary depth, and dynamic attribute names can occur at any level. The documents in the following example data object each contain a contact attribute, and the attribute name within the contact attribute is different for each document:

```
{
_id: "msmith",
first_name: "Miriam",
last_name: "Smith",
age: 36,
role: "Developer",
start_date: "1998-08-22",
contact: {
  "work": {
    street: "1234 Foo St",
    city: "Barville",
    postcode: 3456
  }
}
}
{
_id: "jharris",
first_name: "Jan",
last_name: "Harris",
age: 38,
load: 4.2,
role: "Manager",
start_date: "1998-03-01",
contact: {
  "office": {
    street: "Level 5, 55 Southbank Blvd",
    city: "Southbank",
    postcode: 3006
  }
}
}
{
_id: "esorenson",
first_name: "Ed",
last_name: "Sorenson",
age: 20,
load: 0.5,
role: "Developer",
start_date: "2009-03-23",
contact: {
  "postal": {
    street: "PO Box 1234",
    city: "Melbourne",
    postcode: 3000
  },
  "billing": {
    street: "1234 Foo St",
    city: "Barville",
    postcode: 3456
  }
}
}
{
_id: "pjackson",
first_name: "Peter",
last_name: "Jackson",
age: 33,
load: 0.1,
role: "Developer",
start_date: "2008-04-01",
contact: {
  "home": {
    street: "49 Maple Ave",
    city: "Melbourne",
    postcode: 3001
  }
}
}
```

The mapping module 124 can map this data object to two tables, including the Employee Table 2 described above (table 1622 in FIG. 16C) and the following Employee_Contact Table (table 1624 in FIG. 16C):

| Employee_Contact Table | | | | |
|---|---|---|---|---|
| _id | place | street | city | postcode |
| msmith | work | 1234 Foo St | Barville | 3456 |
| jharris | office | Level 5, 55 Southbank Blvd | Southbank | 3006 |
| esorenson | postal | PO Box 1234 | Melbourne | 3000 |
| esorenson | billing | 1234 Foo St | Barville | 3456 |
| pjackson | home | 49 Maple Ave | Melbourne | 3001 | iv MongoDB Example 4—Mixed Dynamic Document Values

Sometimes some of the attribute names in a document or sub-document are common to each documents in a data object, while other attributes are different for each document, as in the following example:

```
{
_id: "msmith",
first_name: "Miriam",
last_name: "Smith",
age: 36,
role: "Developer",
start_date: "1998-08-22",
contact: {
  phone home: "5755000",
  phone work: "7365000",
  "work": {
    street: "1234 Foo St",
    city: "Barville",
    postcode: 3456
  }
}
}
{
_id: "jharris",
first_name: "Jan",
last_name: "Harris",
``` age: 38,
load: 4.2,
role: "Manager",
start_date: "1998-03-01",
contact: { phone_home: "5827001",
    phone_work: "5758001",
    "office": {
      street: "Level 5, 55 Southbank Blvd",
      city: "Southbank",
      postcode: 3006
    }
  }
}
{
_id: "esorenson",
first_name: "Ed",
last_name: "Sorenson",
age: 20,
load: 0.5,
role: "Developer",
start_date: "2009-03-23",
contact: {
    phone_home: "8462002",
    phone_work: "6382002",
    "postal": {
      street: "PO Box 1234",
      city: "Melbourne",
      postcode: 3000
    },
    "billing": {
      street: "1234 Foo St",
      city: "Barville",
      postcode: 3456
    }
  }
}
{
_id: "pjackson",
first_name: "Peter",
last_name: "Jackson",
age: 33,
load: 0.1,
role: "Developer",
start_date: "2008-04-01",
contact: {
    phone_home: "4552003",
    phone_work: "9562003",
    "home":}
      street: "49 Maple Ave",
      city: "Melbourne",
      postcode: 3001
    }
  }
}

Here the contact attribute is a document with a mixture of common and differing attributes. The mapping module 124 can map this data object to two tables, including the Employee_Contact Table (table 1634 in FIG. 16D) described above and the following Employee Table 3 (table 1632 in FIG. 16D):

Employee Table 3

| _id | first_name | last_name | age | load | role | start_date | contact_phone_home | contact_phone_work |
|---|---|---|---|---|---|---|---|---|
| msmith | Miriam | Smith | 36 | null | Developer | 1998 Aug. 22 | 95755278 | 37365572 |
| jharris | Jan | Harris | 38 | 4.2 | Manager | 1998 Mar. 1 | 75827163 | 35758293 |
| esorenson | Ed | Sorenson | 20 | 0.5 | Developer | 2009 Mar. 23 | 98462841 | 76382956 |
| pjackson | Peter | Jackson | 33 | 0.1 | Developer | 2008 Apr. 1 | 74552759 | 29562853 | v MongoDB Example 5—Further Nesting

Documents can include more complex nesting structures, such as in the following example data object:
{
_id: "msmith",
first_name: "Miriam",
last_name: "Smith",
age: 36,
role: "Developer",
start_date: "1998-08-22",
contact: {
    phone_home: "5755000",
    phone_work: "7365000",
    "work": {
      street: [
        "Unit 2",
        "1234 Foo St"
      ],
      city: "Barville",
      postcode: 3456
    }
  }
}
{
_id: "jharris",
first_name: "Jan",
last_name: "Harris",
age: 38,
load: 4.2,
role: "Manager",
start_date: "1998-03-01",
contact: {
    phone_home: "5827001",
    phone_work: "5758001",
    "office": {
      street: [
        "Level 5",
        "55 Southbank Blvd"
      ],
      city: "Southbank",
      postcode: 3006
    }
  }
}
{
_id: "esorenson",
first_name: "Ed",
last_name: "Sorenson",
age: 20,
load: 0.5,

```
    role: "Developer",
    start_date: "2009-03-23",
    contact: {
      phone_home: "8462002",
      phone_work: "6382002",
      "postal": {
        street: [
          "PO Box 1234"
        ],
        city: "Melbourne",
        postcode: 3000
      },
      "billing": {
        street: [
          "Unit 2",
          "1234 Foo St"
        ],
        city: "Barville",
        postcode: 3456
      }
    }
  }
  {
    _id: "pjackson",
    first_name: "Peter",
    last_name: "Jackson",
    age: 33,
    load: 0.1,
    role: "Developer",
    start_date: "2008-04-01",
    contact: {
      phone_home: "4552003",
      phone_work: "9562003",
      "home": {
        street: [
          "49 Maple Ave"
        ],
        city: "Melbourne",
        postcode: 3001
      }
    }
  }
```

The mapping module 124 can map this data object to three tables, including the Employee Table 3 (table 1642 in FIG. 16E) described above, the Employee_Contact Table (table 1644 in FIG. 16E), and the following Employee_Contact_Street Table (table 1646 in FIG. 16E):

| Employee_Contact_Street Table | | | |
|---|---|---|---|
| _id | place | index | line |
| msmith | work | 0 | Unit 2 |
| msmith | work | 1 | 1234 Foo St |
| jharris | office | 0 | Level 5 |
| jharris | office | 1 | 55 Southbank Blvd |
| esorenson | postal | 0 | PO Box 1234 |
| esorenson | billing | 0 | Unit 2 |
| esorenson | billing | 1 | 1234 Foo St |
| pjackson | home | 0 | 49 Maple Ave |

As described above with respect to block 610 of FIG. 6, data received from a non-relational data store can be transformed to conform to a relational schema. For document-oriented data stores like MongoDB, one approach to transforming a data object is to request the entire data object, including its document and subdocuments, from the non-relational data store. The query translator 126 can then parse the data object to identify documents having static data and can create corresponding columns and rows for this data. The query translator 126 can also identify subdocuments or arrays corresponding to repeating data and can pivot these subdocuments or arrays to rows in a subtable.

However, if the query received by the query translator 126 requests a subset of the data in the data object, requesting the entire data object can be an inefficient usage of network resources (such as bandwidth). To address this problem, in some embodiments, server-side scripting or programming is performed on a server hosting the non-relational data store. This server-side programming can include iterating through documents, subdocuments, or arrays of the data object to determine which documents, subdocuments, or arrays are applicable to the query. The applicable documents, subdocuments, or arrays can be retrieved and sent to the query translator 126, which transforms the received documents, subdocuments, or arrays to a relational format.

VI. Multi-Dimensional Database Examples

In some embodiments, the mapping module 124 (or plug-in 120*a*) can also map multi-dimensional database objects to one or more relational objects. One type of multi-dimensional database is a cube database, such as an OLAP (Online Analytical Processing) cube or the like. The cube database can include measures and dimensions. A measure in a cube database can be a data point or aggregation, such as a numeric fact. These measures can be categorized by the dimensions. Examples of dimensions include time, geographic location, customers, and products. Each of the elements of a dimension can be summarized using a hierarchy (although hierarchies may be optional). The hierarchy can be a series of parent-child relationships or ordering of levels within a dimension. Measures can be observed at levels in the hierarchy. The dimensions can be top level nodes within the hierarchy; the levels can be leaf nodes; and intermediate nodes can be considered hierarchy nodes. Although described as being a cube, a cube database can include more than three dimensions (such as a hypercube). Further, any of the features described above can be implemented with the multi-dimensional databases described herein.

One of the purposes of an OLAP cube is to provide aggregated data views to allow users/analysts to drill down into these aggregations to discover trends and anomalies. As such, a cube takes a top-down approach to data access, and unless otherwise requested, the coarsest levels are used for data dimensions. If a cube were queried for total sales without specifying any other criteria, for instance, the cube would typically return a one-line summary showing the aggregated sales amount for all products, regions, stores, etc. across whatever time period the cube contains data for. (A cube administrator can change this behavior.) If, for example, there is a calculated measure "Top 10 sold products," that can represent the top 10 products sold when all the data in the cube is taken into account. If instead the user wants to see the top 10 products sold for Australia, the cube can be sliced. When a cube is sliced, data in the selected slice is used for aggregation.

Figure 17A:
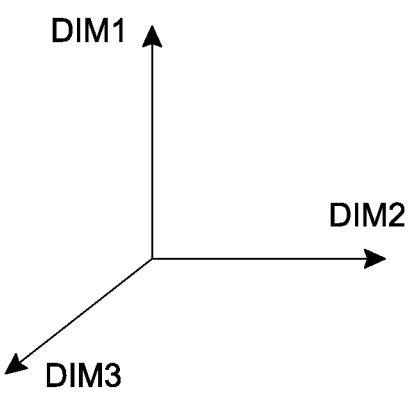
FIGS. 17A-17E illustrate embodiments of cube data structures that can be mapped to relational data objects.
Figure 17B:
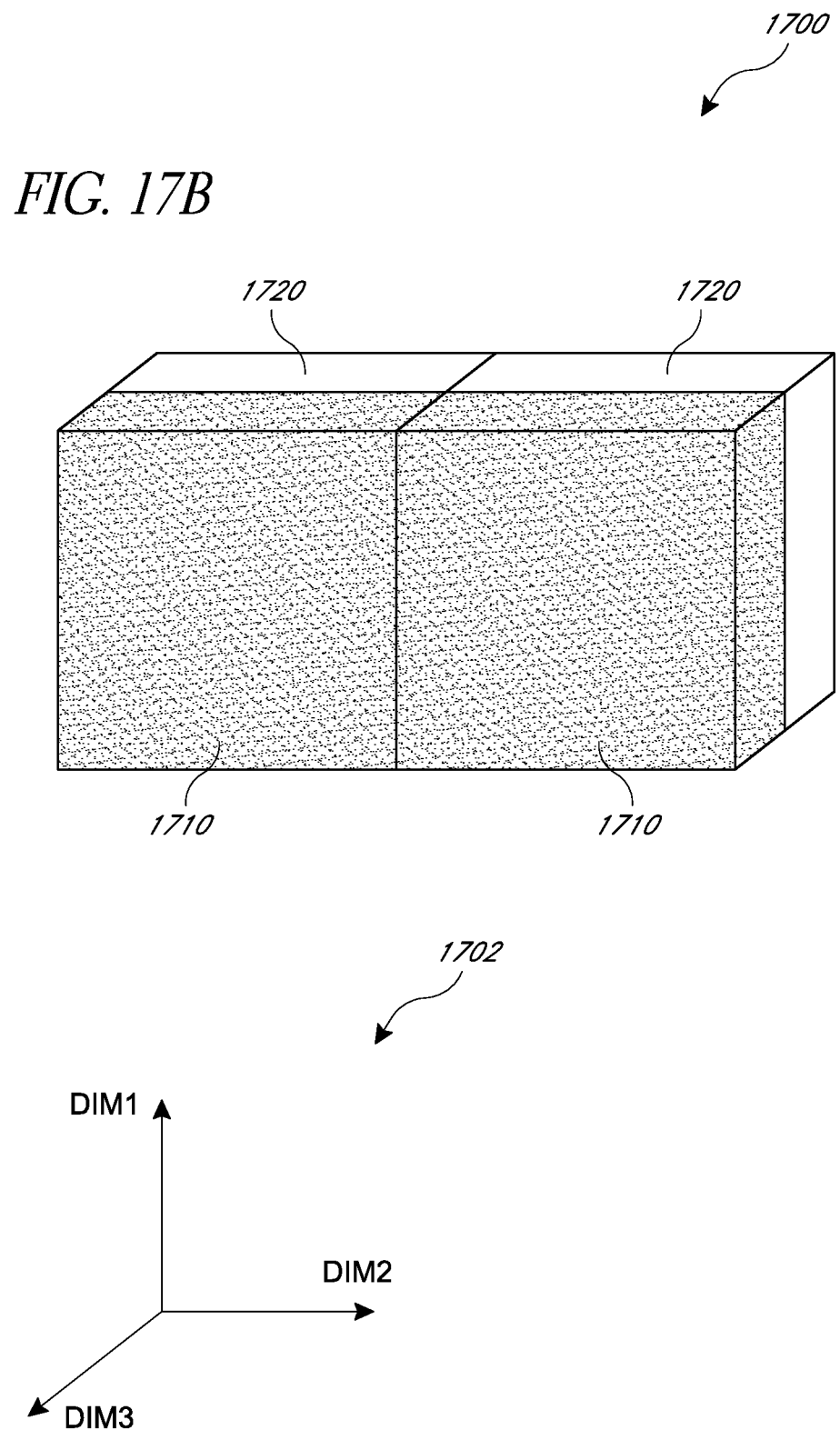

For illustrative purposes, consider a highly simplified 3-cube 1700 with no hierarchies as shown in FIG. 17A. Each axis in the cube corresponds to a Dimension in the cube, as illustrated by axes 1702 (DIM1, DIM2, and DIM3). A user may be interested in the shaded portions 1710 of the cube 1700 shown in FIG. 17B. Slicing can effectively remove a portion of the cube 1700 for the duration of the query, such that the shaded portions 1710 are included for the query whereas the non-shaded portions 1720 are excluded for the query. Query examples for performing slices are described below.

Figure 17C:
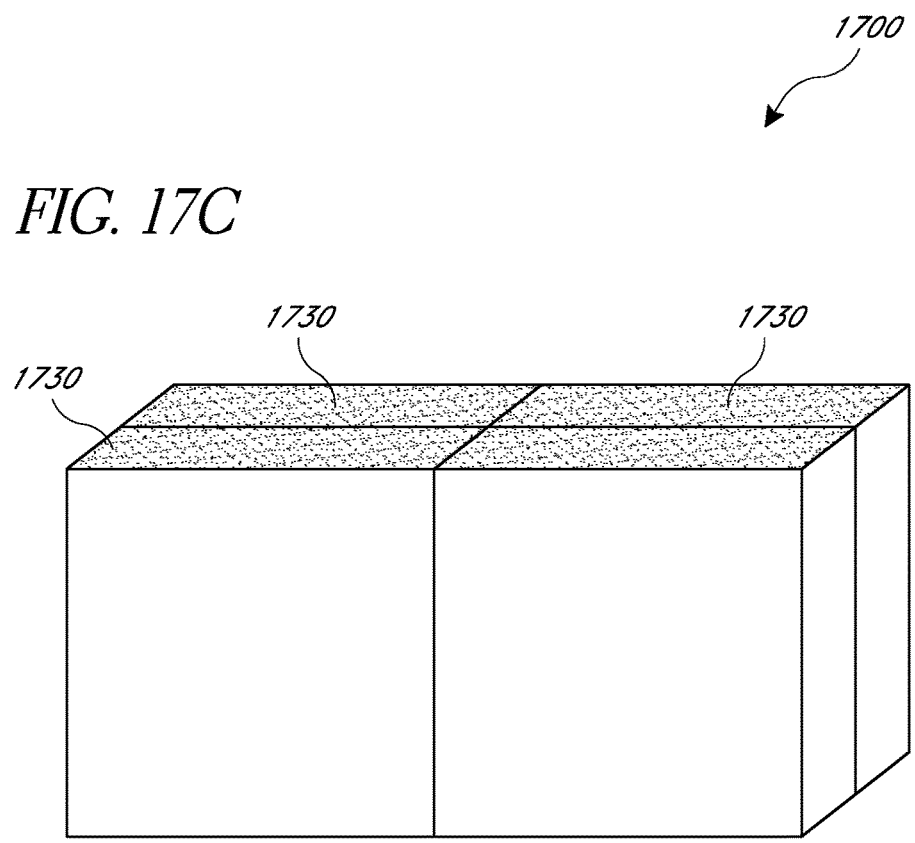
Figure 17C:
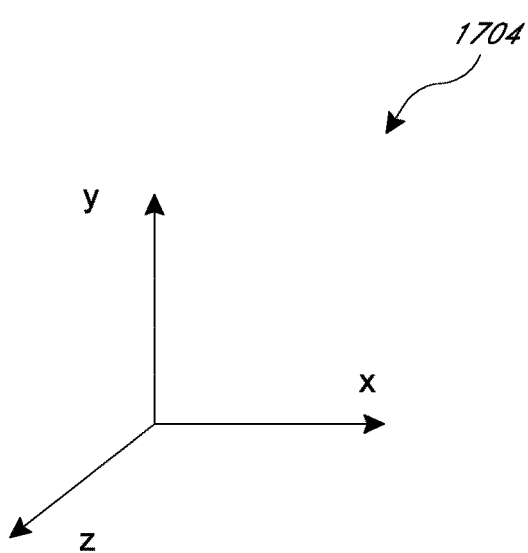
Figure 17D:
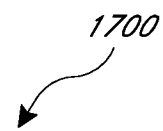
Figure 17D:
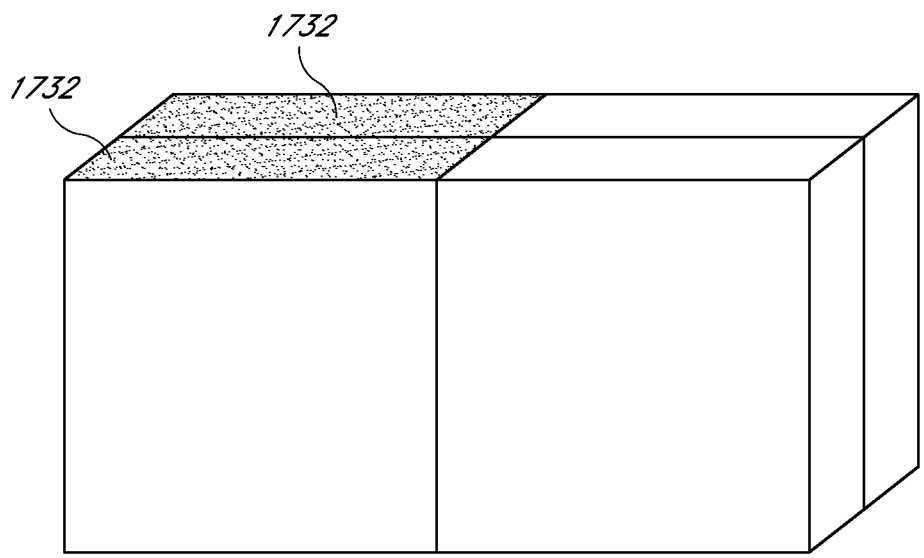
Figure 17D:
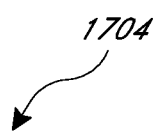
Figure 17D:
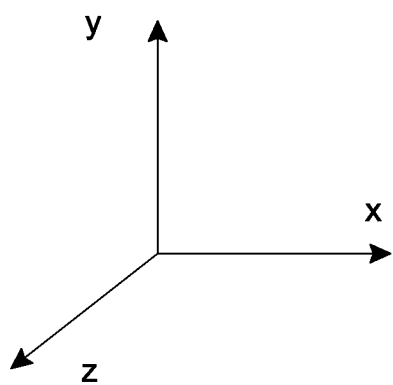
Figure 17E:
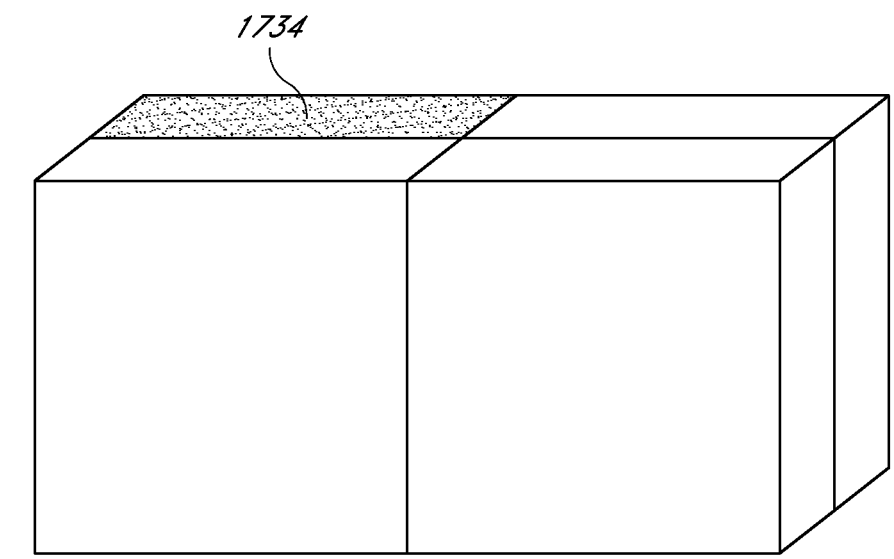

Slicing the cube can affect what portion of the underlying data is used to calculate the measure aggregations but may not specify which data we wish to observe. Another way to select a portion of the measures in a cube is to perform a cross-join of dimensions in the cube. A cross join of dimensions provides a virtual surface from which to select what measures to view. Further, the N-dimensional data in the cube can be displayed by way of a Cartesian product generated from the cross-joining of select dimensions. Consider the extremely simplified 3-cube 1700 again, another example of which is shown in FIG. 17C. By default a table mapped from this cube 1700 (see below) might be displaying the top surfaces 1730, being the cross-join of the x and z axes 1704. For a particular query, a user may be interested in just a portion of the surface, such as the portions 1732 shown in FIG. 17D. To limit the mapped table thus, the cross-join for a dimension such as the x dimension can be used, as shown. Query examples for performing cross-joins are described below.

The plug-in 120a or mapping module 124 can access a cube via a web service call or other network connection. For instance, in one embodiment, a cube can be accessed using a SOAP-based XML for Analytics (XMLA) interface. The native query language for many cube databases is MultiDimensional eXpressions (MDX), rather than SQL. MDX includes many different features from SQL. For example, the cube database (or simply cube) imposes ordering on members in a dimension, and MDX contains explicit support to reference such traversals as forwards, backwards, upwards, downwards, crosswise, and the like. MDX statements can also return N-dimensional results, where N depends on how the query was formulated.

i Translating a Cube to a SQL Table

As the high-level information derived by querying an entire cube space may not be very useful, it can be desirable to provide additional hierarchy level, slice, and/or cross-join criteria to the cube for certain queries. In certain embodiments, the database system 110 can enable such additional query information by allowing a user to specify an MDX query at mapping time, thereby receiving a 1- or 2-dimensional result, and project this result as a SQL table. However, a drawback to this approach is that drill-downs within a hierarchy, slice, etc. can be limited. Another similar approach would be to allow the user to pick measures and dimensions when mapping the SQL table and project the cross-join of those dimensions as the SQL table. Again, this approach may be of limited use, as it may not facilitate drill-downs or slicing.

In certain embodiments, the database system 110 provides a more flexible approach by allowing the user to specify the criteria as a value provided for a SQL column in the mapped table. The criteria would be expressed in MDX, either as a cross-join or slice clause. The mapped table would in this instance have columns for each of the measures of interest in the cube (selected at table mapping time), a column for displaying the row identity/element names, and the columns for the MDX cross-join and slices. Once mapped, the user would be able to issue a SQL query such as the following:

"select * from cube where mdx_crossjoin='{[Sales Territory].[Sales Territory].[Country] * [Products].[Products].[Product Category]} and mdx_slice='([Date].[Calendar].[Year].[CY 2002])'".

Although useful, this approach also has two notable down-sides. First, users must be familiar enough with MDX to know how to phrase the values to use in the SQL WHERE clause. Second, the results may be compressed into a single column, forcing the user to use complicated SQL expressions if he/she wishes to extract a part of the results, whereas ideally each part of the results should reside in its own column (e.g., country, product_category).

Thus, in certain embodiments, as another approach, the database system 110 enables a user to choose which dimensions, hierarchies, slices, and/or cross-joins to include in the mapped table, as well as the measures. The user is free to either pick an explicit level within a hierarchy, or to pick the hierarchy itself, in which case the mapped table can have a "level column" for that hierarchy. Depending on whether the user opts to have the flexibility to slice or cross-join a particular hierarchy, the mapped table can have a "slice column" and/or "cross-join column" for that hierarchy/level. With such a mapped table, the user can then use familiar SQL to query the cube in various ways, including at different levels in the hierarchies, using different cross-joins and different slices. A relational table mapped from a cube may therefore not behave like other relational tables. Instead, the table's content can change based on how the table is queried. Thus, a mapped table can behave like a view-port into the cube.

The mapping module 124 can therefore perform various operations to map and extract data from the cube. These operations can include one or more of the following, among others: selecting which dimensions to include, selecting a level to view measures at, selecting a slice of the cube to include in aggregation calculations, and selecting a cross join or view-port on the resulting surface.

In one embodiment, the outcome of the mapping module 124 selecting which dimensions to include is fixed at the time of the mapping of the cube. In other embodiments, the dimensions selected can subsequently be changed or remapped. Each dimension mapped can correspond to one to three or more columns in the resulting relational table. These columns in turn can enable the other three operations described above (selecting a level, slice, and cross-join) to be performed via SQL queries against the table. The three possible columns for a dimension, in one embodiment, can be a level column, a slice column, and a cross-join column. Fewer than all of these three columns can be mapped for any given dimension. More columns may also be mapped in some implementations, for example, to facilitate more complex AND or OR selections in queries.

Mapping a cube to a table can include performing a dimensionality reduction, reducing the three or more dimensions of the cube to a one or two-dimensional table. This mapping can be considered a projection of the selected dimensions into a lower dimensional space. The mapping module 124 can perform this dimensionality reduction or projection. In addition, in some embodiments, the mapping module 124 also normalizes the data obtained in a projection or in any subset of a cube. Normalization can also be optional in certain embodiments.

For each cube, the mapping module 124 can discover a list of fields that corresponds to the set of some or all levels in some or all hierarchies and dimensions together with some or all measures.

ii Example SQL Statements for Selecting Levels, Slices, and Cross-Joins

In one example, assume that there is a Product dimension in the cube, and that it has a hierarchy called Product Categories which in turn has the levels Category, Subcategory and Product. If a table has been mapped to include this dimension, the user can pick which level of granularity to observe measures at by querying for a particular value in the level column. For example, the user might query as follows: "select * from cube where prod_level='Subcategory';" This query could result in the query translator 126 asking the cube for measures aggregated at Subcategory level instead of the default level (which in this case might be 'Category').

In one example, a SQL query on a cube slice might look something like the following: "select prod_name from table_with_top_10_prod_sold_dim where country_slice='Australia';" Note that here the values returned can look completely different from what a plain "select *" returns from a normal relational table. An example of using a cross-join query, in contrast, might be as follows: "select * from cube where year_crossjoin='2010'", which could filter the result set to only include rows for the year 2010.

The valid values to plug into a slice column can be visible in the corresponding cross-join column when not slicing on that dimension. The values in the cross-join column can vary depending on what level is used for the query. A slice is not limited to reducing only a single dimension; it can be perfectly valid to slice into multiple dimensions. With the mapping module 124, slicing multiple dimensions can be performed by a user specifying values for multiple slice columns. The supported comparison operations for slice columns can include, among others: =, <, <=, >, >=, <>, IN, NOT IN, and BETWEEN.

iii Ordering

As mentioned earlier, a cube database can impose an order on the members of each level, and this order can be further customized by the cube administrator. When slicing and limiting the cross-join, the mapping module 124 therefore uses the cube's ordering, rather than an arbitrary display ordering imposed by the database system 110. For example, if the 'Country' level of a cube has defined the ordering to be France→Germany→UK→Canada→US→Australia, when a user wishes to use the cross-join [UK, US], the mapping module 124 also includes Canada.

The mapping module 124 can by default returns rows in the order indicated by the cube, but this order can be changed with a SQL ORDER BY clause. In one embodiment, the user is free to apply any SQL "order by" clauses to change the order in the result set, rather than the order in the cube itself. In certain embodiments, there are no non-standard constraints on this ordering, and any valid collations can be specified by the user if so desired. As will be described below (see section entitled "Proxy Layer Features"), the proxy layer 112 can enforce the cube ordering on SQL queries. Without enforcing cube ordering on queries, the database system 110 may return corrupt results sets.

iv Ranges

Cross-join and slice columns can accept either a set or a range (open, closed or unbounded at either end) to be used to restrict the cross-join or slice to that particular set or range. For the above mentioned range [UK, US], the SQL query could look something like: "select * from cube where country_crossjoin>='UK' and country_crossjoin<='US';" or perhaps "select * from cube where country_crossjoin between 'UK' and 'US';" This query could correctly limit the cross-join to the UK, Canada and US rows, and no additional rows may be computed or transferred.

If a user were to specify a range that includes an endpoint that does not exist in the cube, the query translator 126 can still return valid data in one embodiment. For instance, the query translator 126 can assume that the user meant the first or last entry in the ordered set of cube data. As an example, suppose a user requested country data in the range of A to US, and the country "A" does not exist in the cube. The query translator 126 can instead select the range from the first country in the cube (which may be Australia, for instance) and return the range of [<first country>, US].

If a single member is requested, and it does not exist, the result set may be empty. So the following query, "select * from cube where country_slice='nowhere';", may not return any rows.

v Formatted Values Vs Raw Values

A cube may have a concept of formatted values as well as raw values. For example, when querying a cube using a native cube system, the output can include the formatted values (e.g., currencies might show up as "$8,123,441.12"). However, the cube system might perform sorting on the raw values.

The mapping module 124 can account for both raw and formatted values, mapping either or both. In one embodiment, the mapping module 124 deals solely with the raw values as they are mapped to a limited set of relational types. For example, the mapping module 124 can map certain cube types to relational types as follows, while allowing users to customize the data types mapped:

SHORT, LONG, USHORT and ULONG can map to INTEGER
FLOAT, DOUBLE, CURRENCY can map to REAL
Strings and any unknown types can map to VARCHAR Further, additional cube element properties may be exposed. These properties can include custom formatting of element values, recommended presentation attributes such as text color, or other element meta-data.

vi Proxy Layer Features

In certain embodiments, the mapping module 124 pushes down cube selection criteria such as level selection, slicing, cross-join, and/or other operations to the cube, rather than pulling all data from the cube and then applying such filtering. The mapping module 124 can instead pull at least some data from the cube and apply filtering in other embodiments. However, it may be undesirable to do so as transferring a large amount of data from a cube could consume significant network and computing resources.

Moreover, it may not even be possible to perform cube selection or filtering operations in the SQL engine 114 as would normally be the case when dealing with relational or non-relational data sources. While the amount of data transferred might be prohibitive if not pushing down the criteria for relational and non-relational data sources, the eventual result would still be correct for such data sources. This may not be the case when the data source is a cube, as the data returned can change depending on how the cube is queried. Each query can result in a projection of a particular plane in the cube, and many of the planes (e.g., levels) are parallel and therefore mutually exclusive, and as such would not even be possible to project to relational tables simultaneously. This filtering deficiency results, in certain embodiments, from using MySQL as the database system 110 to which a cube plug-in 120a may be provided. Due to index range optimizations performed by MySQL (and some other database systems) and due to the structure and ordering of data in a cube, using MySQL's SQL engine 114 to filter cube results may result in incorrect or incomplete results.

Another issue with the SQL engine 114 is that the SQL engine 114 may performs post-processing of the returned result set from the cube. This post-processing can have severe negative effects such as preventing the plug-in 120a from sending through rows ordered in the manner the cube itself has them ordered. This de-ordering can reduce usability, as it may be important to a user to know what elements a range operator really includes when cross-joining or slicing. With different SQL engines 114 or an expanded storage engine API, this post-processing problem might not be an issue. Likewise, with a different SQL engine 114 or storage engine API, the proxy layer 112 cube filtering might not be necessary.

One way that the mapping module 124 can push down cube selection criteria to a cube is to leverage the functionality of the proxy layer 112. The proxy layer 112 can pass cube selection criteria specified in a SQL WHERE clause to the plug-in 120a or mapping module 124, thereby ensuring that the criteria is not processed by the SQL engine 114. The proxy layer 112 can also strip the WHERE clause out of a SQL query prior to providing the query to the SQL engine 114, thereby preventing the SQL engine 114 from processing cube selection criteria. Stripping the WHERE clause can also include stripping any operators such as =, <, <=, >, >=, < >, IN, NOT IN, and BETWEEN applied to a level/slice/cross-join column. In some embodiments, the proxy layer 112 may (but need not) pass WHERE clauses related to measure columns to the SQL engine 114, however, as such clauses may still be properly executed by the SQL engine 114.

In one embodiment, the proxy layer 112 passes cube selection criteria in a WHERE clause to a plug-in 120a by creating a temporary, query-specific copy of a mapped table and by attaching the cube selection criteria to this table as metadata. The proxy layer 112 can then rewrite the original SQL query so that the SQL query uses this temporary table instead, as well as removing the filter criteria from the WHERE clause. This approach can elegantly avoid concurrency issues which might arise if the proxy layer 112 were frequently changing the cube selection criteria associated with a mapped table. However, the proxy layer 112 need not create a temporary table in some embodiments Some or all of the following additional tasks may be performed by the proxy layer 112, among others:
- Remove some or all indexes from the mapped table used for the query to avoid any risk of the SQL engine 114 performing undesired post-filtering of the result set.
- Reject undefined operations on a level/slice/cross-join, such as LIKE. (However, in other embodiments, LIKE could be used on a cross-join column and be left for the SQL engine 114 to post-filter the result set.)
- Reject queries which apply OR to level/slice/cross-join columns.

vii Transformation of Results into Relational Data

As described above with respect to block 610 of FIG. 6, data received from a non-relational data store can be transformed to conform to a relational schema generated by the mapping module 124. In previous examples described above with respect to column and document data stores, the data store returned metadata that described the data returned from the query. Column names and values could therefore be reconstructed from this data. In contrast, a cube database that is sliced, cross-joined, or otherwise filtered can return the measures in the cube without returning information about the context of those measures. For example, if a cube were sliced to select a country and a sum of revenue for sales in that country where that country is Australia, the cube would simply return the sum of revenue without any metadata indicating that this revenue corresponds to Australia.

To reconstruct a row of data from this type of query, the query translator 126 can store the parameters of the SQL WHERE clause and dynamically generate the results for the column corresponding to the WHERE clause. In the example above, the query translator 126 can store "Australia" as the value to include in a row corresponding to a "country" column. Upon receiving the sum of revenue measure from the cube, the query translator 126 can combine the stored "Australia" value and the sum of revenue value to form a row in the mapped table.

viii Example Cube Mapping User Interfaces

FIGS. 18 through 22 illustrate examples of user interfaces 1800-2200 for mapping a data object from a cube data store to a relational data object. The user interfaces 1800-2200 can be generated by the mapping module 124 and/or plug-in 120a described above.

Figure 18:
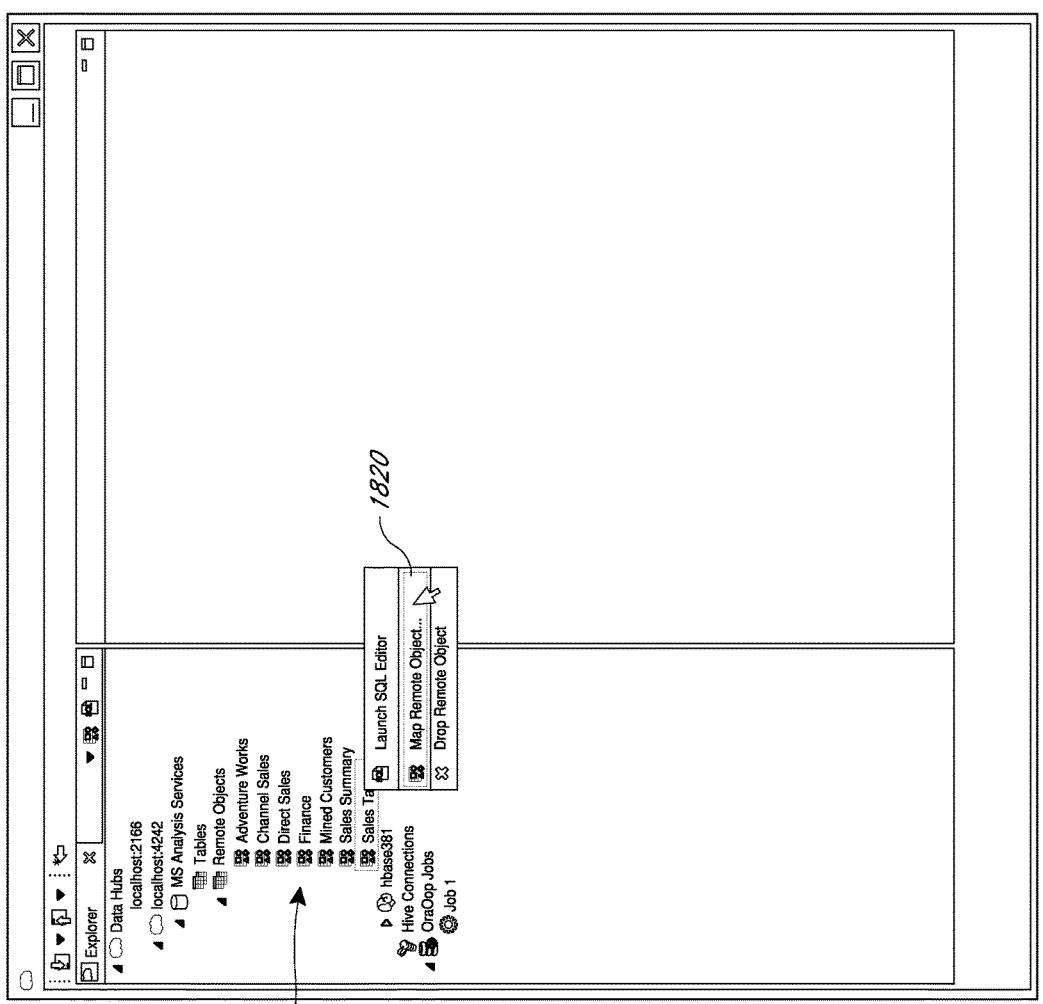
FIGS. 18 through 22 illustrate embodiments of user interfaces for mapping a data object from a cube data store to a relational data object.

Referring specifically to FIG. 18, the user interface 1800 is another example of a user interface that allows a user to initiate mapping of a remote object similar to FIG. 3. A list 1810 of cube objects is shown, a selection of which can result in a context menu 1820 being displayed. The context menu 1820 includes a "map remote object" option, which can be selected by a user to initiate a cube mapping process. Selection of the map remote object option can result in mapping module 124 (for example) presenting the user with any of the user interfaces 1900-2200 depicted in FIGS. 19 through 22.

Figure 19:
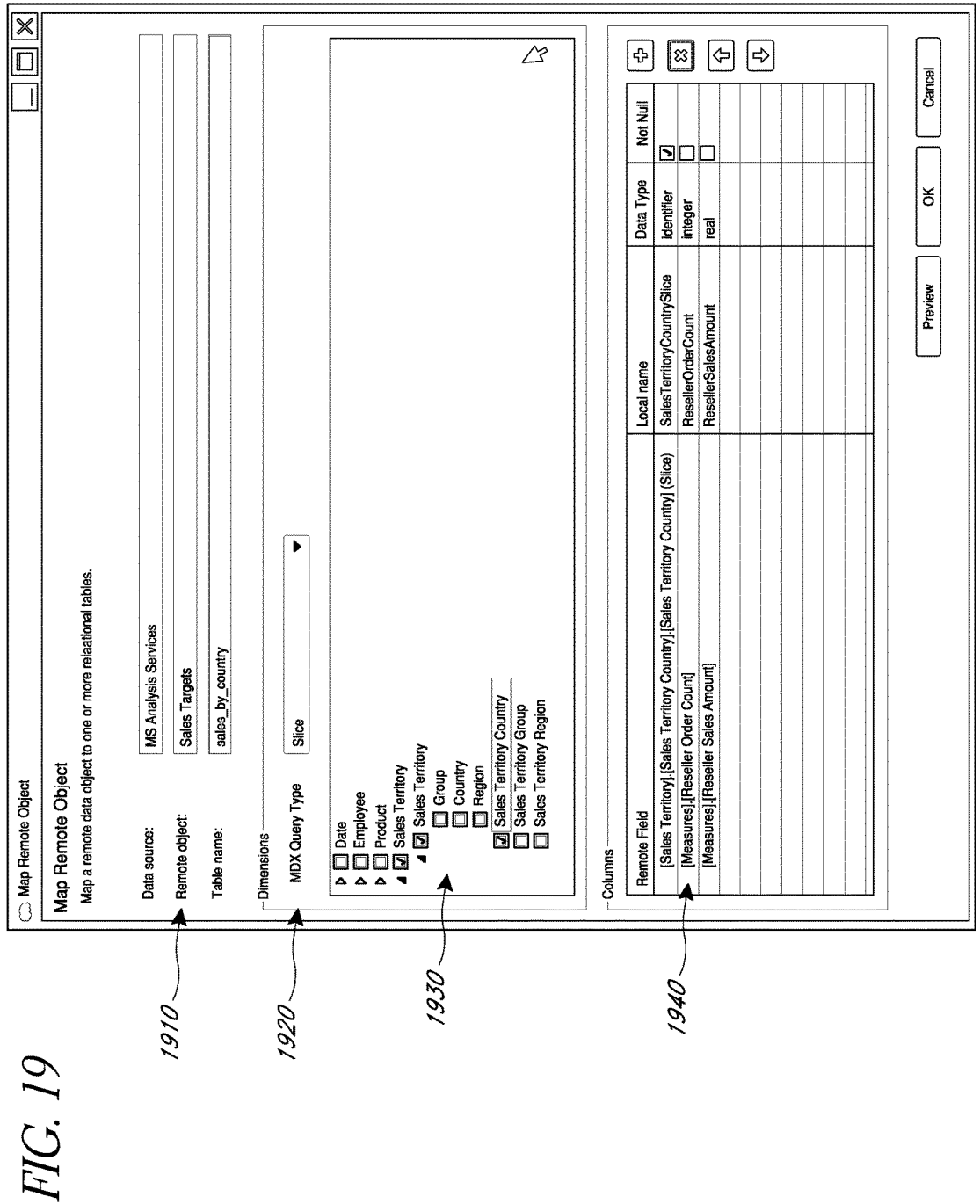

Turning to FIG. 19, one example of such a mapping user interface 1900 is shown, illustrating implementation of a slice column. The user interface 1900 includes fields 1910 for specifying data about the remote data object, such as the data source, the name of the object, and a name of a table to be generated from the data object. Further, the user interface 1900 includes a select option 1920 for specifying the type of MDX query to be performed, such as slice, cross-join, or both. In the depicted embodiment, the query type selected is a slice.

Storage attributes 1930 obtained from the data cube, including dimensions, hierarchies, and/or levels, are also shown. A user can select which storage attributes 1930 to map to a relational table. Selection of these storage attributes 1930 can result in the mapping module 124 generating a table description 1940, which illustrates remote storage attributes, their mapped local (relational) column names, and their data type. As above, a user can adjust or customize the names of these columns, their data type, and/or any constraints (such as not null).

The following Sales_By_Country Table is an example table mapped from a cube, as illustrated by the table description 1940 in FIG. 19:

| Sales_By_Country Table sales_by_country | |
| --- | --- |
| SalesTerritoryCountrySlice | identifier |
| ResellerOrderCount | integer |
| ResellerSalesAmount | double |

An example SQL query on this table could be as follows: select * from sales_by_country where SalesTerritoryCountrySlice="Australia". Such a query can return one row for Australia, where the scope of calculated measures is Australia. Another sample SQL query could be as follows: select * from sales_by_country where SalesTerritoryCountrySlice in ("USA", "Australia"). This query can return one row combining USA and Australia, where the scope of calculated measures is those two countries.

Figure 20:
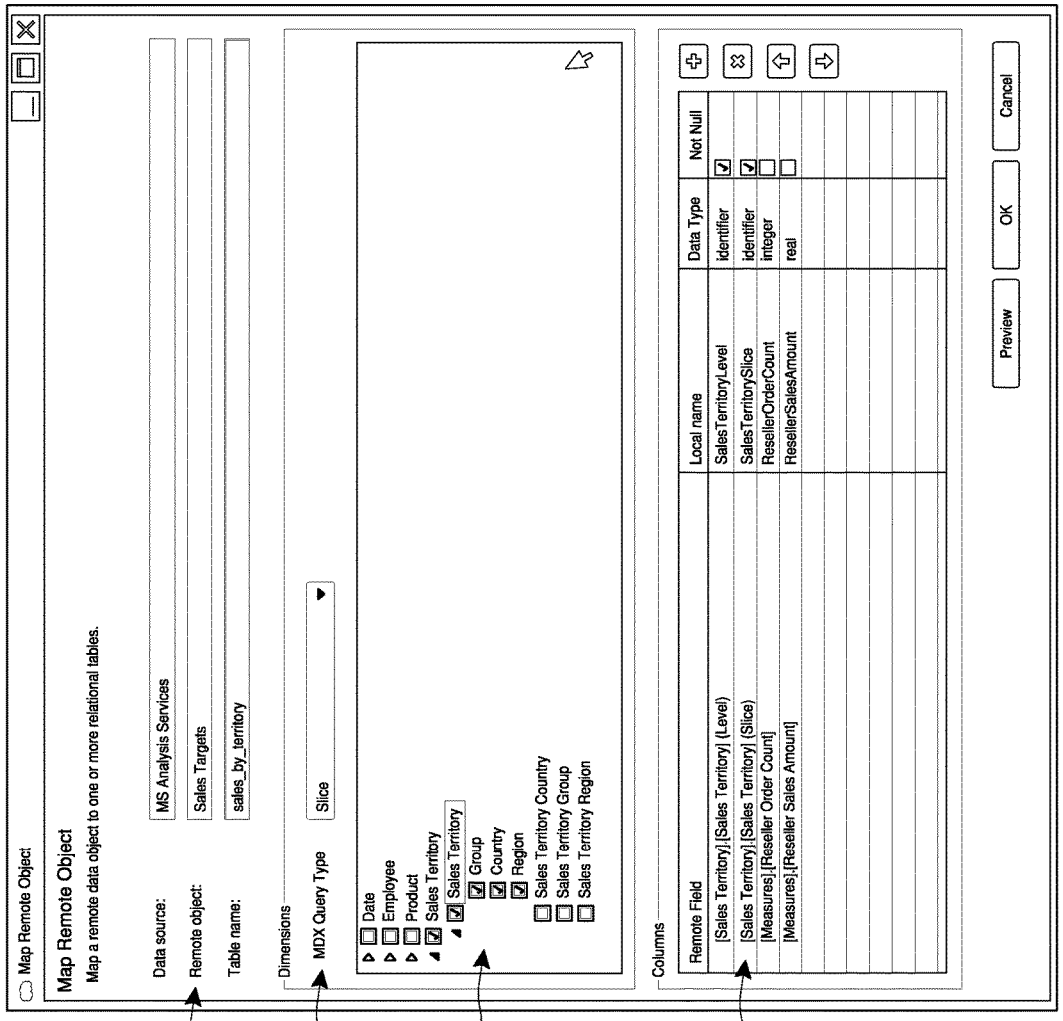

In FIG. 20, another example of a mapping user interface 2000 is shown. The user interface 2000 also includes the fields 1910 for specifying data about the remote data object, as in FIG. 19. Likewise, the user interface 2000 includes a select option 1920 for specifying the type of MDX query to be performed, such as slice, cross-join, or both. As in FIG. 19, the query type selected is a slice.

Storage attributes 2030 obtained from the data cube, including dimensions, hierarchies, levels, and/or measures, are also shown. A user can select which storage attributes 2030 to map to a relational table. The attributes selected include attributes from a hierarchy, such as Sales Territory, Group, Country, and Region. The slice shown is therefore a hierarchy slice, which is a mapping where it can be possible to slice on multiple levels within a hierarchy (as there are both level and slice columns generated in the depicted embodiment).

Selection of these storage attributes 2030 can result in the mapping module 124 generating a table description 2040, which illustrates remote storage attributes, their mapped local (relational) column names, and their data type. As above, a user can adjust or customize the names of these columns, their data type, and/or any constraints (such as not null).

The following Sales_By_Territory Table is an example table mapped from a cube, as illustrated by the table description 2040 in FIG. 20:

| Sales_By_Territory Table sales_by_territory | |
| --- | --- |
| SalesTerritoryLevel | identifier |
| SalesTerritorySlice | identifier |
| ResellerOrderCount | integer |
| ResellerSalesAmount | double |

An example SQL query on this table could be as follows: select * from sales_by_territory where SalesTerritorySlice="Australia" and SalesTerritoryLevel="Country". Such a query can return one row for Australia, where the scope of calculated measures is Australia.

Figure 21:
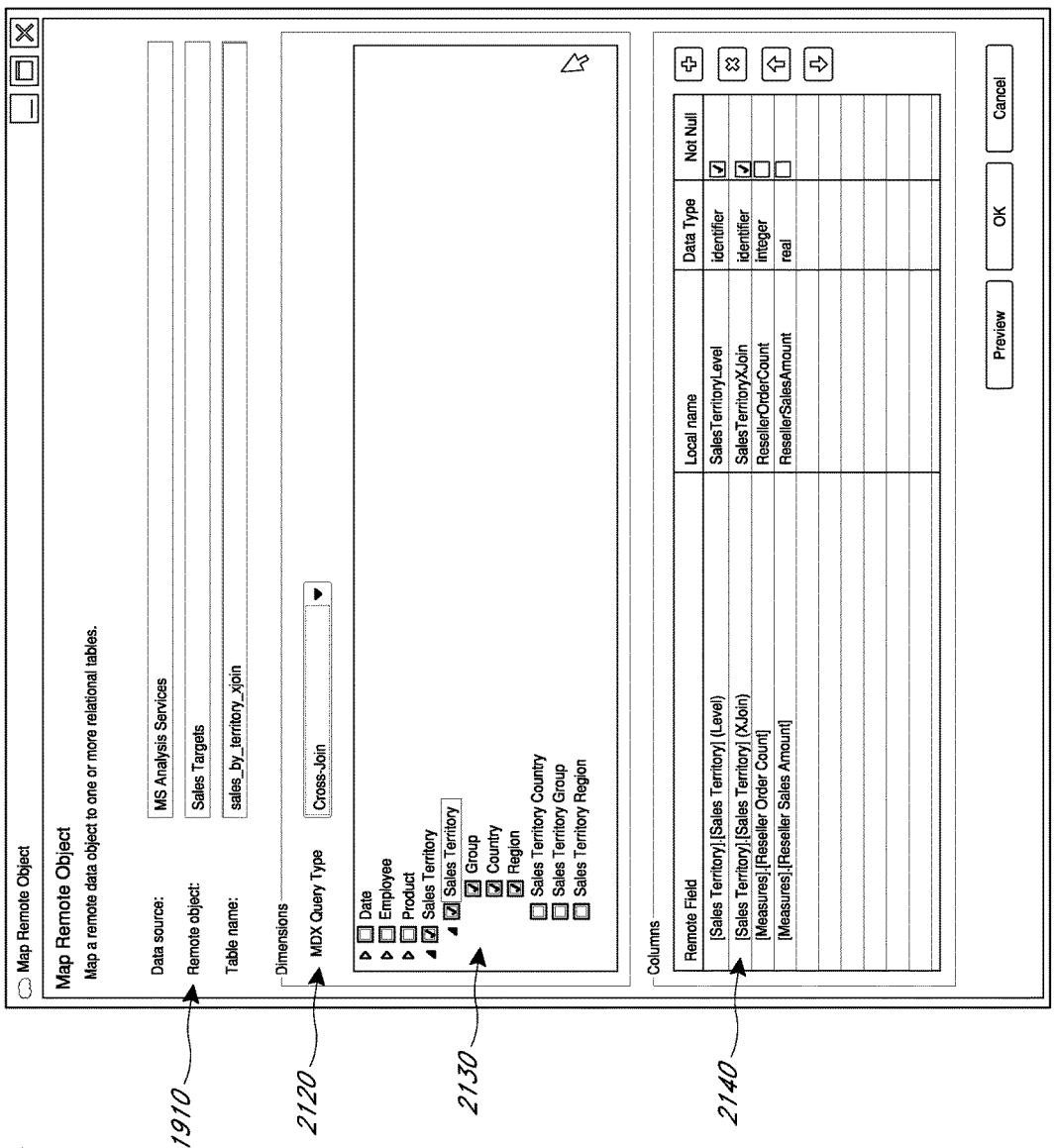

In FIG. 21, another example of a mapping user interface 2100 is shown. The user interface 2100 also includes the fields 1910 for specifying data about the remote data object, as in FIG. 19. Likewise, the user interface 2100 includes a select option 2120 for specifying the type of MDX query to be performed, such as slice, cross-join, or both. In the depicted embodiment, the query type selected is a cross-join.

Storage attributes 2130 obtained from the data cube are also shown. A user can select which storage attributes 2130 to map to a relational table. Selection of these storage attributes 2130 can result in the mapping module 124 generating a table description 2140, which illustrates remote storage attributes, their mapped local (relational) column names, and their data type. As above, a user can adjust or customize the names of these columns, their data type, and/or any constraints (such as not null).

The following Sales_By_Territory_Xjoin Table is an example table mapped from a cube, as illustrated by the table description 2140 in FIG. 21:

| Sales_By_Territory_Xjoin Table sales_by_territory_xjoin | |
| --- | --- |
| SalesTerritoryLevel | identifier |
| SalesTerritoryXJoin | identifier |
| ResellerOrderCount | integer |
| ResellerSalesAmount | double |

An example SQL query on this table could be as follows: select * from sales_by_territory_xjoin where SalesTerritoryLevel="Country" and SalesTerritoryXJoin in ("Australia", "Japan", "USA"). Such a query can return three rows, one for each country, where the scope of calculated measures is global.

Figure 22:
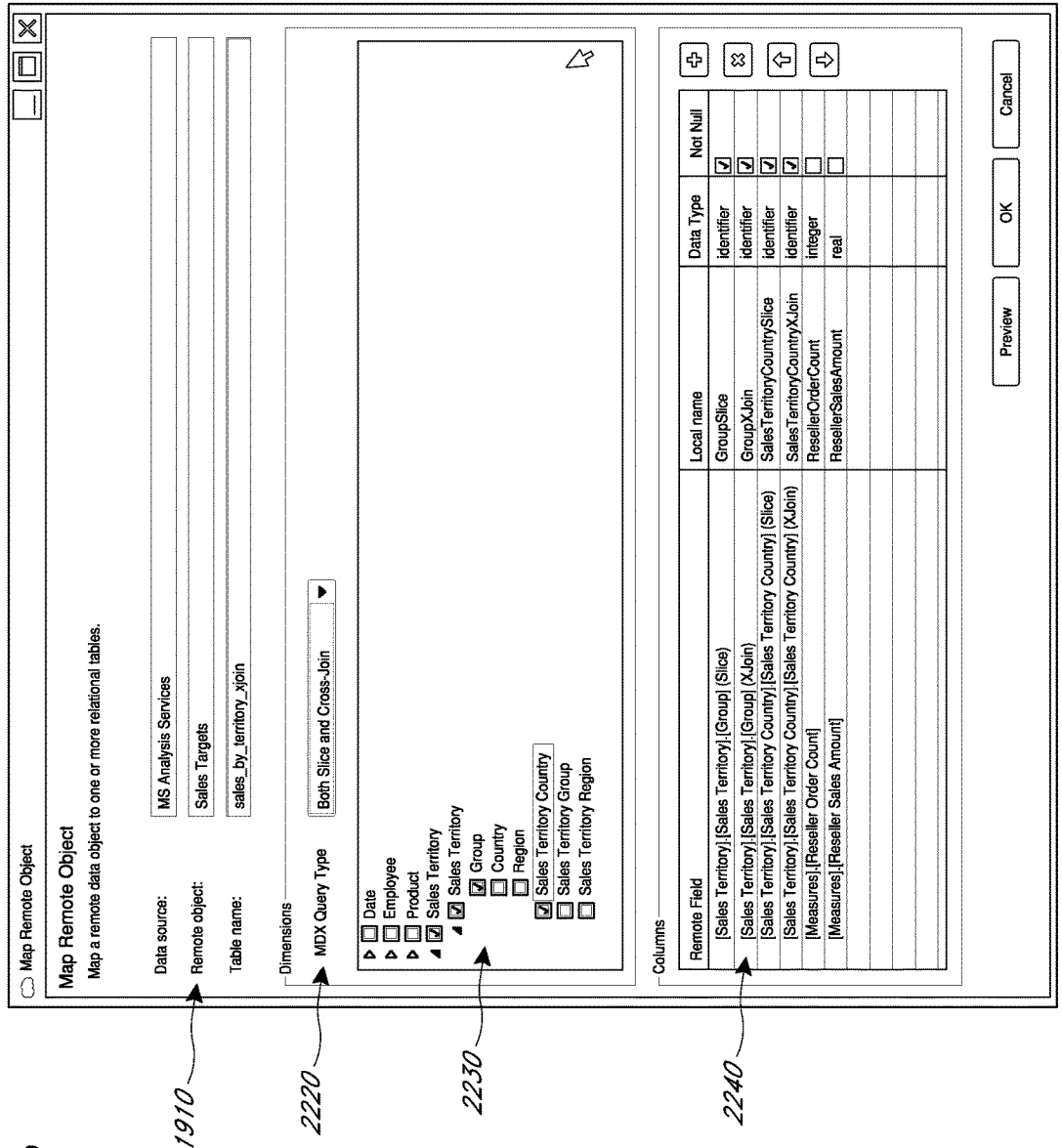

In FIG. 22, yet another example of a mapping user interface 2200 is shown. The user interface 2200 also includes the fields 1910 for specifying data about the remote data object, as in FIG. 19. Likewise, the user interface 2200 includes a select option 2220 for specifying the type of MDX query to be performed, such as slice, cross-join, or both. In the depicted embodiment, the query type selected is both a slice and a cross-join.

Storage attributes 2230 obtained from the data cube are also shown. A user can select which storage attributes 2230 to map to a relational table. The attributes 2230 selected include attributes from a Sales Territory slice and a Sales Territory Country Slice. In addition, a Group level in the Sales Territory hierarchy is also selected.

Selection of these storage attributes 2230 can result in the mapping module 124 generating a table description 2240, which illustrates remote storage attributes, their mapped local (relational) column names, and their data type. As above, a user can adjust or customize the names of these columns, their data type, and/or any constraints (such as not null).

The following Sales_By_Group_With_Country Table is an example table mapped from a cube, as illustrated by the table description 2240 in FIG. 22:

| Sales_By_Group_With_Country Table sales_by_group_with_country | |
| --- | --- |
| GroupSlice | identifier |
| GroupXJoin | identifier |
| SalesTerritoryCountrySlice | identifier |
| SalesTerritoryCountryXJoin | identifier |
| ResellerOrderCount | integer |
| ResellerSalesAmount | double |

An example SQL query on this table could be as follows: select * from sales_by_group where GroupSlice="Pacific" and SalesTerritoryCountryXJoin in ("Australia", "Japan").

Such a query can return two rows, one for Australia and one for Japan, where the scope of calculated measures is all Pacific countries.

VII. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the database system 110 or DMM 120*b* can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for providing structured query language access to a data object, the system comprising a computer processor interoperably coupled to memory, wherein the computer processor is operable to execute:
    a mapping module configured to:
        identify storage attributes of a data object stored within a data store, the data object being incompatible with a subset of structured query language (SQL),
        analyze the storage attributes to determine whether the storage attributes comprise any static attributes and any repeating attributes,
        in response to identifying a static attribute in the storage attributes, creating a first virtual table comprising a column having a first relational attribute that is based at least partly on the static attribute; and
        in response to identifying repeating data in the storage attributes, generating a second virtual table related to the first virtual table, the second virtual table comprising a column having a second relational attribute that is derived from the repeating data, wherein the second virtual table logically represents data stored in the data object without storing a copy of the data in the data object; and
    a proxy layer configured to:
        receive a request to execute a selected SQL command on one or both of the first and second virtual tables, determine the data store to be capable of performing join operations;

in response to the determination, split the SQL command into a first SQL join command to be applied to the data store and a second SQL join command to be applied to a second data store comprising a second data object, in response to receiving the request to execute the selected SQL command, send a first instruction to the data store to cause the data store to perform a join operation on the data object responsive to the first SQL join command, receive first results from the join operation performed by the data store, send a second instruction to the second data store to cause the second data store to return second results, and apply the second SQL join command to the first results and the second results.

2. The system of claim 1, wherein the computer processor is further operable to execute a query translator, wherein the query translator is configured to send said instruction from the proxy layer to the data store by making an application programming interface (API) call to the data store.

3. The system of claim 1, wherein the mapping module is further configured to map a second data object of the data store to a third virtual table.

4. The system of claim 2, wherein one or both of the mapping module and the query translator are included in a plug-in to a database management system (DBMS).

5. The system of claim 1, wherein the system comprises a plurality of computing devices.

6. A method of providing structured query language access to a data object, the method comprising:

identifying storage attributes of a data object stored within a non-relational data store;

analyzing the storage attributes by a computer system comprising computer hardware to determine whether the storage attributes comprise any static attributes and any repeating data;

in response to identifying a static attribute of the storage attributes, programmatically creating a first virtual table comprising a first column that is based at least partly on the static attribute; and in response to identifying repeating data of the storage attributes, programmatically generating a second virtual table related to the first virtual table, the second virtual table comprising a second column that is derived from the repeating data;

receiving a request to execute a selected SQL command on one or both of the first and second virtual tables;

determining the data store to be capable of performing join operations;

in response to the determining, splitting the selected SQL command into a first SQL join command to be applied to the data store and a second SQL join command to be applied to a second data store comprising a second data object;

in response to receiving the request to execute the selected SQL command, sending a first instruction to the data store to cause the data store to perform a join operation on the data object responsive to the first SQL join command;

receiving first results from the join operation performed by the data store;

sending a second instruction to the second data store to cause the second data store to return second results; and applying the second SQL join command to the first results and the second results.

7. The method of claim 6, wherein said identifying the repeating data further comprises identifying a variable number of entries in records of the data object.

8. The method of claim 6, wherein said identifying the repeating data comprises identifying dynamic data in column names of the data object.

9. The method of claim 6, wherein said identifying the repeating data comprises identifying one or more of the following in the data object: a column family, a supercolumn, and a nested document.

10. The method of claim 6, wherein the first virtual table comprises a mapping from the static attribute to the first column without including actual data stored in the data object.

11. The method of claim 6, wherein the second virtual table comprises a mapping from the repeating data to the second column without including actual data stored in the data object.

12. The method of claim 6, wherein the data store comprises a distributed database.

13. The method of claim 6, wherein the data store comprises one of the following: a document store, a column-oriented data store, and a key-value store.

14. The method of claim 6, further comprising providing a user interface comprising functionality for a user to adjust a data type of the first or second column.

15. The method of claim 6, further comprising providing a user interface comprising functionality for the user to adjust a constraint on the first or second column.

16. Non-transitory physical computer storage comprising computer-executable instructions that direct a computing system to implement a method of providing structured query language access to a data object, the method comprising:

identifying attributes of a data object stored within a data store, the data object being incompatible with a subset of structured query language (SQL); and mapping the attributes to a relational schema to thereby enable SQL queries to be performed with respect to the data object by at least performing one or more of the following:

moving repeating data of the data object to a subtable having a relational association with a parent table created from static data of the data object, and projecting the data object from a higher dimensionality to a lower dimensionality;

receiving a request to execute a selected SQL command on the data;

determining the data store to be capable of performing join operations;

in response to the determining, splitting the selected SQL command into a first SQL join command to be applied to the data store and a second SQL join command to be applied to a second data store comprising a second data object;

in response to receiving the request to execute the selected SQL command, sending a first instruction to the data store to cause the data store to perform a join operation on the data object responsive to the first SQL join command;

receiving first results from the join operation performed by the data store;

sending a second instruction to the second data store to cause the second data store to return second results; and applying the second SQL join command to the first results and the second results.

17. The non-transitory physical computer storage of claim 16, wherein the attributes of the data object comprise dimensions of a cube data store.

18. The non-transitory physical computer storage of claim 17, wherein said projecting the data object comprises creating one or more of the following columns: a level column, a slice column, and a cross-join column, thereby enabling one or more of a level, slice, and cross-join to be selected from the cube data store.

19. The non-transitory physical computer storage of claim 17, further comprising passing cube selection criteria in the SQL command directly to the cube data store, bypassing a SQL engine.

20. The non-transitory physical computer storage of claim 16, wherein said mapping comprises at least partially normalizing the data object.

21. The non-transitory physical computer storage of claim 16, in combination with a computer system comprising computer hardware.

* * * * *